US011800952B2

(12) United States Patent
Chen et al.

(10) Patent No.: US 11,800,952 B2
(45) Date of Patent: Oct. 31, 2023

(54) STEAM VALVE FOR COOKING UTENSIL AND COOKING UTENSIL

(71) Applicant: FOSHAN SHUNDE MIDEA ELECTRICAL HEATING APPLIANCES MANUFACTURING CO., LIMITED, Foshan (CN)

(72) Inventors: Wei Chen, Foshan (CN); Chuanbin Zhu, Foshan (CN); Wei Yuan, Foshan (CN); Zhengting Fu, Foshan (CN); Yuquan Wu, Foshan (CN); Xianhuai Chen, Foshan (CN); Linbo Zhu, Foshan (CN); Fei Lou, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 844 days.

(21) Appl. No.: 16/844,973

(22) Filed: Apr. 9, 2020

(65) Prior Publication Data
US 2020/0268201 A1 Aug. 27, 2020

Related U.S. Application Data

(63) Continuation of application No. PCT/CN2017/116232, filed on Dec. 14, 2017.

(30) Foreign Application Priority Data

Oct. 13, 2017 (CN) .......................... 201710954048.X
Oct. 13, 2017 (CN) .......................... 201710954051.1
(Continued)

(51) Int. Cl.
*A47J 36/38* (2006.01)
*F16K 24/04* (2006.01)
(Continued)

(52) U.S. Cl.
CPC .............. *A47J 36/38* (2013.01); *A47J 27/16* (2013.01); *F16K 24/04* (2013.01); *F16T 1/34* (2013.01); *F16T 1/36* (2013.01); *F16T 1/14* (2013.01)

(58) Field of Classification Search
CPC . A47J 36/38; A47J 27/56; F16K 24/04; F16K 27/00; F16T 1/00; F16T 1/36; F16T 1/45; F16T 1/12; F16T 1/14; F16T 1/16
See application file for complete search history.

(56) References Cited

FOREIGN PATENT DOCUMENTS

CN 201585875 U 9/2010
CN 201879500 U 6/2011
(Continued)

OTHER PUBLICATIONS

Foshan Shunde Midea Electric Heating Appliance Manufacturing Co., Ltd., Notice of the First Examination, CN Application No. 201710954048.X, dated Mar. 3, 021, 6 pgs.
(Continued)

Primary Examiner — Reginald Alexander
(74) Attorney, Agent, or Firm — Morgan, Lewis & Bockius LLP

(57) ABSTRACT

A steam valve for a cooking utensil and the cooking utensil are provided. The steam valve includes a valve base, a bonnet and a barrier member. The bonnet and the valve base form a mounting chamber. The valve base has a steam inlet, and at least one of the valve base and the bonnet has a steam outlet. The barrier member is mounted in the mounting chamber, the barrier member and a top wall of the bonnet define a first passage therebetween, steam flows from the steam inlet via the first passage to the steam outlet, and a bottom wall of the valve base corresponding to the barrier member is disposed obliquely such that liquid flows back to the steam inlet.

16 Claims, 14 Drawing Sheets

(30) Foreign Application Priority Data

Oct. 13, 2017 (CN) .......................... 201721329689.8
Oct. 13, 2017 (CN) .......................... 201721375333.8

(51) Int. Cl.
| | | |
|---|---|---|
| *F16T 1/36* | (2006.01) | |
| *A47J 27/16* | (2006.01) | |
| *F16T 1/34* | (2006.01) | |
| *F16T 1/14* | (2006.01) | |

(56) References Cited

FOREIGN PATENT DOCUMENTS

| | | | |
|---|---|---|---|
| CN | 102805551 | A | 12/2012 |
| CN | 203041848 | U | 7/2013 |
| CN | 204445487 | U | 7/2015 |
| CN | 105078268 | A | 11/2015 |
| CN | 205144291 | U | 4/2016 |
| CN | 205267896 | U | 6/2016 |
| CN | 205458084 | U | 8/2016 |
| CN | 106015682 | A | 10/2016 |
| CN | 205885296 | U | 1/2017 |
| CN | 206120066 | U | 4/2017 |
| CN | 106859323 | A | 6/2017 |
| CN | 206239189 | U | 6/2017 |
| CN | 206252294 | U | 6/2017 |
| CN | 206303757 | U | 7/2017 |
| CN | 206354913 | U | 7/2017 |
| CN | 208435347 | U | 1/2019 |
| EP | 2338389 | A1 | 6/2011 |
| JP | 2010246658 | A | 11/2010 |
| JP | 2012239710 | A | 12/2012 |
| JP | 2013255785 | A | 12/2013 |
| JP | 2014054300 | A | 3/2014 |
| KR | 20090068085 | A | 6/2009 |
| WO | WO-2019062644 | A1 * | 4/2019 ............. A47J 27/00 |

OTHER PUBLICATIONS

Self-Gravity Pressure Control Energy-Saving Rice Cooker, China Academic Journal Electronic Publishing House, English Translation, http://www.cnki.net, 1994-2021, 9 pgs.

Foshan Shunde Midea Electrical Heating Appliances Manufacturing Co. Ltd., International Search Report and Written Opinion, PCT/CN2017/116232, dated Jul. 6, 2018, 10 pgs.—No Translation Available.

Foshan Shunde Midea Electrical Heating Appliances Manufacturing Co. Ltd., International Preliminary Report on Patentability, PCT/CN2017/116232, dated Apr. 14, 2020, 4 pgs.

Foshan Shunde Midea Electrical Heating Appliances Manufacturing Co. Ltd., Extended European Search Report, EP 17898338.3, dated Apr. 3, 2019, 6 pgs.

Notice of Reasons for Refusal, JP 2018-536880, dated Nov. 11, 2019, 10 pgs.

Notification of Reason for Refusal, KR10-2018-7022586, dated Sep. 10, 2019, 9 pgs.

Foshan Shunde Midea Electrical Heating Appliances Manufacturing Co. Ltd., First Office Action, CN Application No. 201710954051.1, dated Jan. 2, 2021, 6 pgs.

* cited by examiner

STEAM VALVE FOR COOKING UTENSIL AND COOKING UTENSIL

CROSS-REFERENCE TO RELATED APPLICATIONS

This application is a continuation application of PCT/CN2017/116232, filed on Dec. 14, 2017, which claims priority to: (1) Chinese Patent Application No. 201721375333.8, filed with the State Intellectual Property Office of P. R. China on Oct. 13, 2017, (2) Chinese Patent Application No. 201710954051.1, filed with the State Intellectual Property Office of P. R. China on Oct. 13, 2017, (3) Chinese Patent Application No. 201710954048.X, filed with the State Intellectual Property Office of P. R. China on Oct. 13, 2017, and (4) Chinese Patent Application No. 201721329689.8, filed with the State Intellectual Property Office of P. R. China on Oct. 13, 2017, which are incorporated by reference herein in their entirety.

TECHNICAL FIELD

The present disclosure relates to a field of household appliances, more particularly to a steam valve for a cooking utensil and the cooking utensil.

BACKGROUND

In the related art, a steam valve is an essential component of a cooking utensil. The steam valve is used to communicate an interior of the cooking utensil with an exterior of the cooking utensil, such that moisture inside the cooking utensil can be well evaporated when the cooking utensil is cooking rice, and meanwhile a buffering space can be provided for rice-water during a boiling stage when cooking rice. The higher the cooking power is and the more violent the boiling is, the sweeter the rice is. However, a problem caused by the high cooking power is that the rice-water is prone to spilling in the cooking process. The cooking power of the boiling stage is generally lowered in order to ensure that the rice-water does not spill during the boiling stage, which however influences operation efficiency of the cooking utensil, and is time-consuming.

SUMMARY

The present disclosure seeks to solve at least one of the problems existing in the related art. To this end, the present disclosure proposes a steam valve for a cooking utensil, which has advantages of a simple structure and good spill-proof performance.

The present disclosure further proposes a cooking utensil having the above steam valve.

The steam valve according to embodiments of the present disclosure includes a bonnet; a valve base, the bonnet and the valve base forming a mounting chamber, the valve base having a steam inlet, at least one of the valve base and the bonnet having a steam outlet; and a barrier member mounted in the mounting chamber, in which the barrier member and a top wall of the bonnet define a first passage therebetween, steam flows from the steam inlet via the first passage to the steam outlet, and a bottom wall of the valve base corresponding to the barrier member is disposed obliquely such that liquid flows back to the steam inlet.

As for the steam valve according to embodiments of the present disclosure, by disposing the barrier member in the mounting chamber, the barrier member can well change a flow passage structure inside the mounting chamber, and can be configured to guide a flow direction of the steam in the mounting chamber, such that the steam can be well discharged from the mounting chamber; furthermore, the barrier member can have a barrier effect on rice-water, the rice-water can flow back along the barrier member; moreover, the bottom wall of the valve base is obliquely disposed, the liquid on the bottom wall can be guided to flow towards the steam inlet, such that the back flow of the rice-water in the mounting chamber can be sped up, spill-proof effect of the steam valve during a boiling stage can be greatly improved; and meanwhile, the barrier member has a simple arrangement structure, a low cost and is easy to achieve.

According to some embodiments of the present disclosure, the other end of the barrier member and the bottom wall of the valve base define a second passage therebetween for flowing of the liquid, the bottom wall of the valve base includes a first inclined section located in the second passage, and the first inclined section is configured to guide the liquid to the steam inlet. Thus, the liquid flowing through at least a part of the first passage can enter the second passage, and the first inclined section in the second passage can guide the liquid to flow towards the steam inlet.

According to further embodiments of the present disclosure, the barrier member includes a flow guide portion including a blocking piece and a reinforcing rib, the blocking piece has a notch, the notch and the bottom wall of the valve base define the second passage, a plurality of blocking pieces is provided, the plurality of blocking pieces is distributed at intervals in an extending direction of the second passage, any two adjacent blocking pieces are connected by the reinforcing rib, and the first inclined section is opposite to the notch. Thus, the notches defined in the plurality of blocking pieces and the bottom wall can cooperatively define a passage for flowing of the liquid, which has a convenient arrangement and is easy to achieve. The reinforcing rib can be configured to connect the plurality of blocking pieces, such that the plurality of blocking pieces can be formed into a whole, facilitating mounting and detachment; and the reinforcing rib can also enhance strength of the flow guide portion.

In some embodiments of the present disclosure, the blocking piece is a flat plate or an arc shaped plate. Thus, a mass of the blocking piece can be reduced, which is convenient to mount and low in cost.

In some embodiments of the present disclosure, the reinforcing rib is located at an end of the blocking piece adjacent to the bonnet. Thus, the reinforcing rib can deform the liquid mixed with the steam on the blocking piece and adjacent to the position of the bonnet, thereby improving the spill-proof effect.

In some embodiments of the present disclosure, the barrier member further includes a barrier portion spaced apart from the flow guide portion, the barrier portion is located at a side of the flow guide portion adjacent to the steam inlet, and an end of the barrier portion adjacent to the valve base is configured to be a guide section to guide the liquid to the steam inlet. Thus, the guide section can guide the liquid flowing out of the second passage, and make it flow towards the steam inlet.

In further embodiments of the present disclosure, the guide section is connected to the bottom wall of the valve base. Thus, the barrier portion can be connected to the bottom wall.

In some examples of the present disclosure, a part of an inner surface of the bonnet and a part of an inner surface of the valve base cooperatively constitute a circumferential wall of the mounting chamber, and an end surface of the barrier portion opposite to the circumferential wall is spaced apart from the circumferential wall to form a third passage. Thus, the liquid can flow back to the steam inlet via the third passage.

In further embodiments of the present disclosure, a distance between the barrier portion and the circumferential wall is 2 mm≤d≤3 mm. Thus, the liquid just flowing out of the steam inlet cannot pass through the third passage due to a large volume.

Further, the bottom wall of the valve base includes at least one second inclined section inclined towards the third passage to guide the liquid to the third passage. Thus, the second inclined section can further guide the liquid at the guide section to flow towards the third passage and then flow towards the steam inlet.

In some examples of the present disclosure, a contact point between the barrier portion and the bottom wall includes a point a and a point e, the point a is adjacent to a middle position of the barrier portion, the point e is adjacent to the third passage, a distance between the point a and a horizontal plane is ha, and a distance between the point e and the horizontal plane is he, the flow guide portion includes a first blocking piece and a second blocking piece, the second blocking piece is located between the first blocking piece and the barrier portion, a contact point between the second blocking piece and the bottom wall includes a point b and a point f, the point b is adjacent to the notch, the point f is adjacent to the third passage, a distance between the point b and the horizontal plane is hb, and a distance between the point f and the horizontal plane is hf, a contact point between the first blocking piece and the bottom wall includes a point c and a point g, the point c is adjacent to the notch, the point g is adjacent to the third passage, a distance between the point c and the horizontal plane is hc, and a distance between the point f and the horizontal plane is hg, the ha, he, hb, hf, hc meet the following relation: ha>he, hb>hf, hc>hg, hg<hf<he. Thus, the back flow of the rice-water can be achieved.

The cooking utensil according to embodiments of the present disclosure includes a steam valve according to any one of the above items.

As for cooking utensil according to embodiments of the present disclosure, by disposing the barrier member in the mounting chamber, the barrier member can well change a flow passage structure inside the mounting chamber, and can be configured to guide a flow direction of the steam in the mounting chamber, such that the steam can be well discharged from the mounting chamber; furthermore, the barrier member can have a barrier effect on rice-water, the rice-water can flow back along the barrier member; moreover, the bottom wall of the valve base is obliquely disposed, the liquid on the bottom wall can be guided to flow towards the steam inlet, such that the back flow of the rice-water in the mounting chamber can be sped up, spill-proof effect of the steam valve during a boiling stage can be greatly improved; and meanwhile, the barrier member has a simple arrangement structure, a low cost and is easy to achieve.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
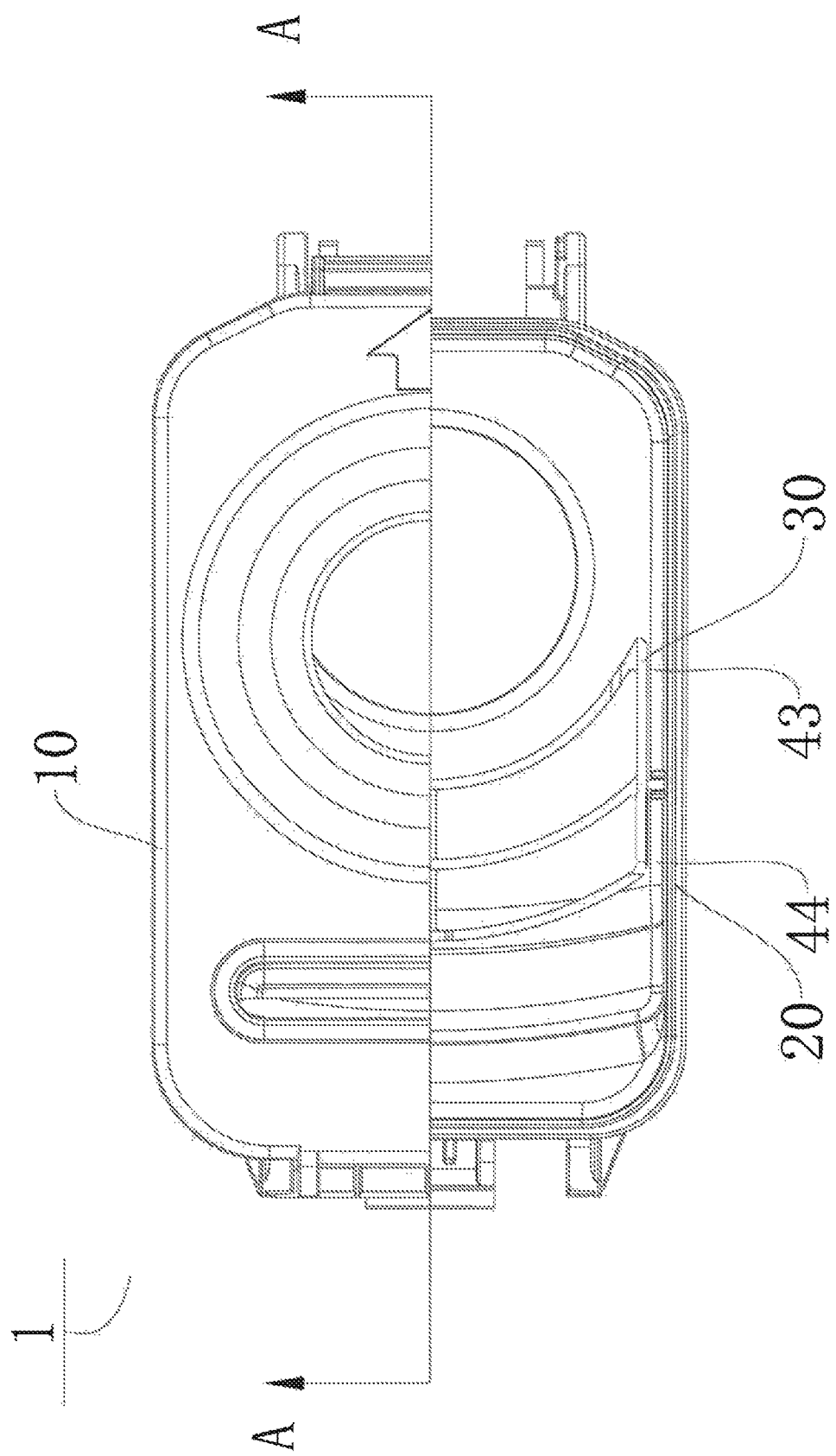
FIG. 1 is a sectional view of a steam valve of a cooking utensil according to an embodiment of the present disclosure.

REFERENCE NUMERALS steam valve 1,
bonnet 10, mounting chamber 11, top wall 110, bottom wall 111, circumferential wall 112, steam inlet 12, steam outlet 13, snap groove 14, open end 141, guiding inclined surface 142, protrusion 15, horizontal plane 16,
valve base 20,
barrier member 30, flow guide portion 31, blocking piece 310, first blocking piece 310a, second blocking piece 310b, notch 311,
reinforcing rib 320, barrier portion 32, guide section 321, first passage 41, second passage 42, third passage 43, fourth passage 44.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "length", "width", "thickness", "front", "rear", "right", "left", "lower", "upper", "horizontal", "vertical", "top", "bottom", "inner", "outer", "axial", "radial", "circumferential" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, the feature defined with "first" and "second" may comprise one or more of this feature expressly or impliedly. In the description of the present disclosure, the term "a plurality of" means two or more than two, unless specified otherwise.

In the description of the present disclosure, unless specified or limited otherwise, it should be noted that, terms "mounted," "connected" and "coupled" may be understood broadly, such as permanent connection, detachable connection or integral connection, electronic connection or mechanical connection, direct connection or indirect connection via intermediary, inner communication between two elements. These having ordinary skills in the art should understand the specific meanings in the present disclosure according to specific situations.

As illustrated in FIGS. 1 to 13, a steam valve 1 for a cooking utensil according to embodiments of the present disclosure includes a bonnet 10, a valve base 20 and a barrier member 30.

Figure 2:
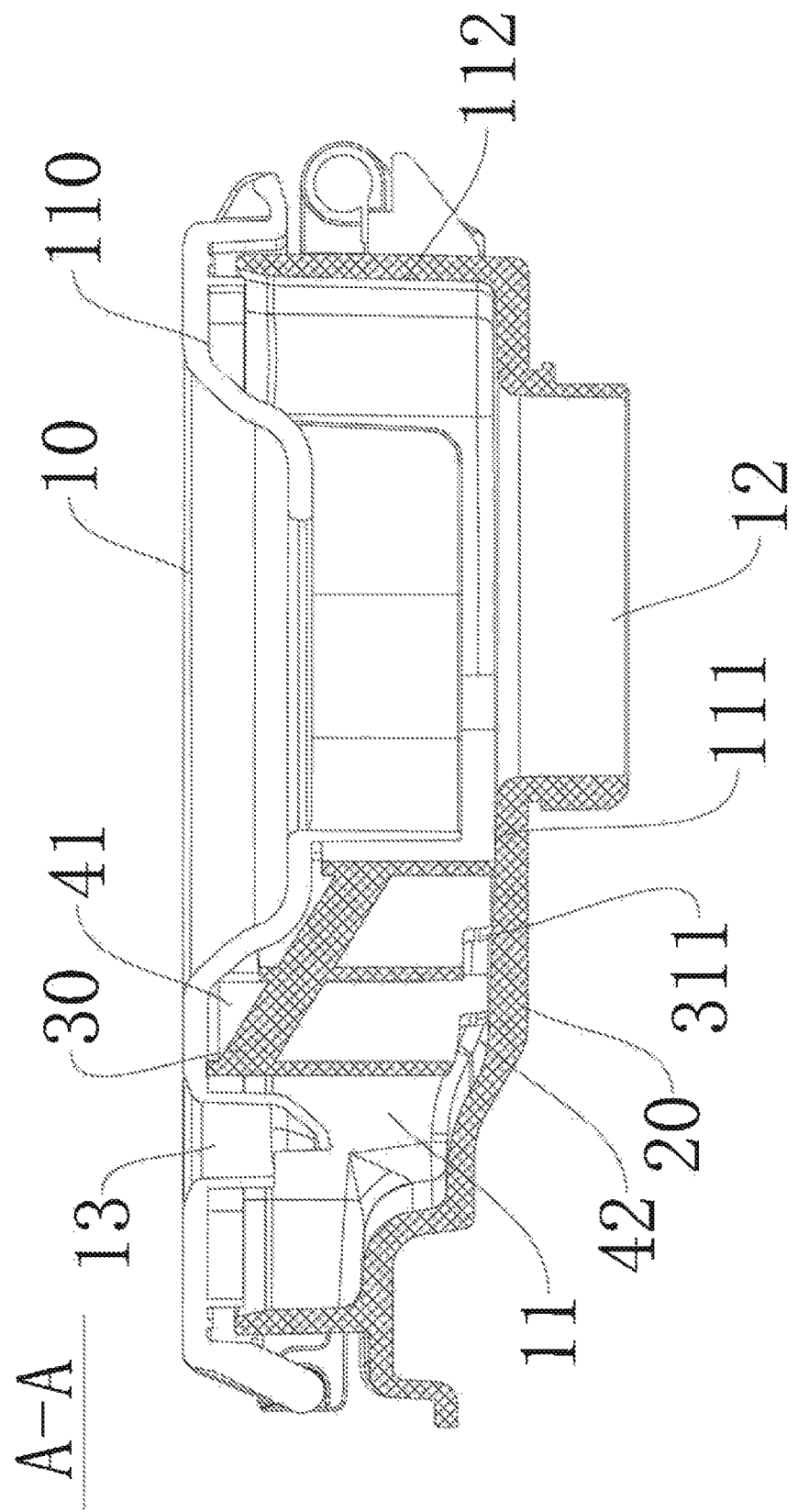
FIG. 2 is a schematic view of a section of a steam valve of a cooking utensil according to an embodiment of the present disclosure.
Figure 3:
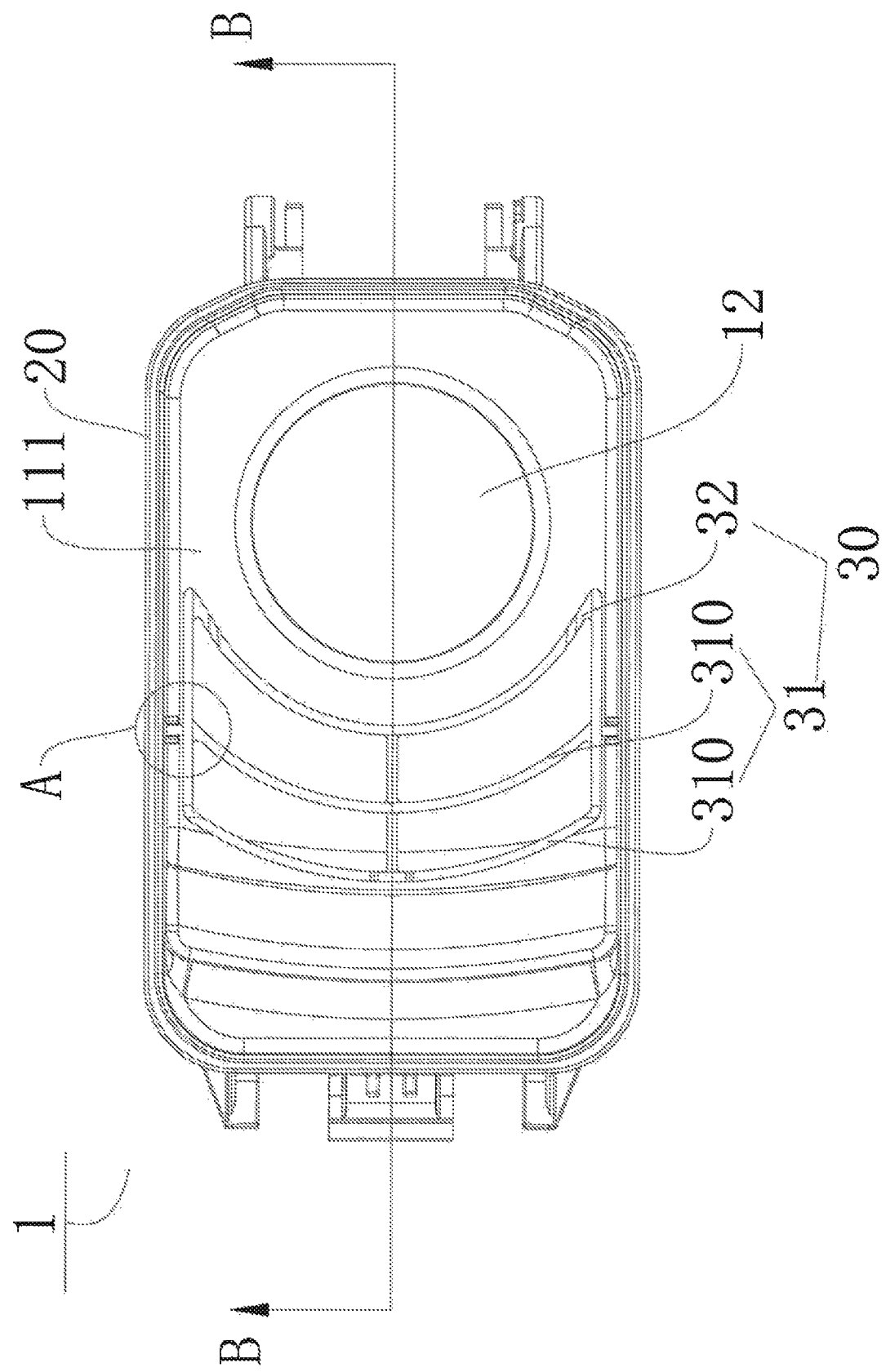
FIG. 3 is a schematically partial view of a steam valve of a cooking utensil according to an embodiment of the present disclosure.
Figure 4:
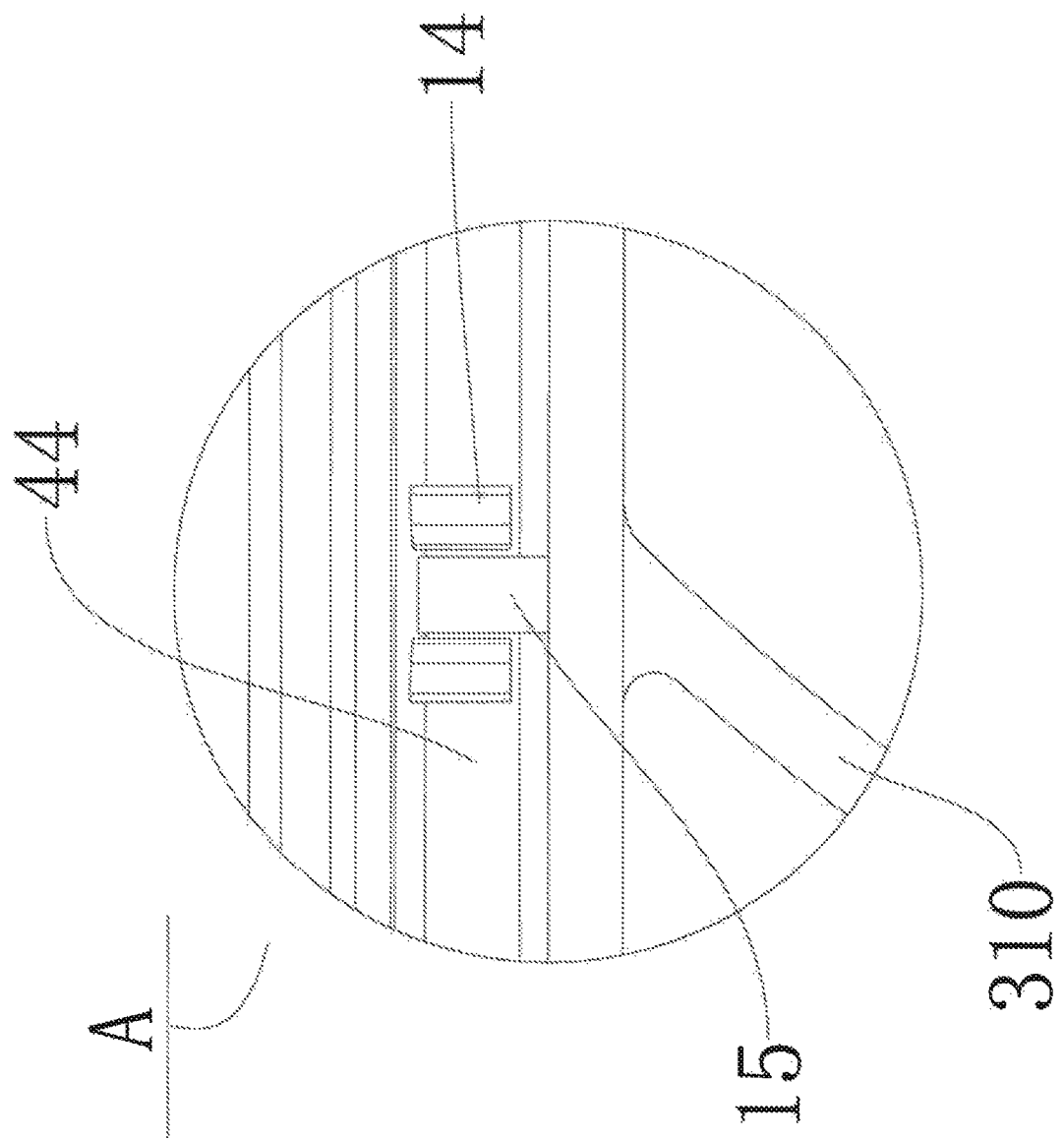
FIG. 4 is a partially enlarged view of a steam valve of a cooking utensil according to an embodiment of the present disclosure.

Specifically, as illustrated in FIG. 2, the bonnet 10 and the valve base 20 form a mounting chamber 11, a part of an inner surface of the bonnet 10 constitutes a top wall 110 of the mounting chamber 11, a part of an inner surface of the valve base 20 constitutes a bottom wall 111 of the mounting chamber 11, the other part of the inner surface of the bonnet 10 and the other part of the inner surface of the valve base 20 cooperatively constitute a circumferential wall 112 of the mounting chamber 11. The valve base 20 has a steam inlet 12, and at least one of the valve base 20 and the bonnet 10 has a steam outlet 13. The barrier member 30 includes at least one blocking piece 310, the at least one blocking piece 310 and the bonnet 10 define a first passage 41 therebetween, and steam flows from the steam inlet 12 via the first passage 41 to the steam outlet 13.

It could be understood that, as illustrated in FIGS. 2-3 and 5-7, the bonnet 10 is connected to the valve base 20, the inner surface of the bonnet 10 and the inner surface of the valve base 20 can define the mounting chamber 11. The valve base 20 is provided with the steam inlet 12, the steam inlet 12 penetrates the valve base 20, and the steam can enter the mounting chamber 11 from an outside of the mounting chamber 11 through the steam inlet 12. The steam outlet 13 can be defined in the bonnet 10, the steam outlet 13 can also be defined in the valve base 20, and the steam outlet 13 can also be constituted cooperatively by a part of the bonnet 10 and a part of the valve base 20. The steam in the mounting chamber 11 can flow out of the mounting chamber 11 through the steam outlet 13.

As illustrated in FIG. 2, in a direction that the steam flows from the steam inlet 12 to the steam outlet 13, the barrier member 30 is located between the steam inlet 12 and the steam outlet 13, the barrier member 30 is spaced apart from the steam inlet 12, and the barrier member 30 is also spaced apart from the steam outlet 13. The barrier member 30 may include one blocking piece 310, and the barrier member 30 may also include a plurality of blocking pieces 310, the at least one blocking piece 310 may be spaced apart from the inner surface of the bonnet 10 to form the first passage 41, and the steam in the mounting chamber 11 can flow through the first passage 41.

It should be noted that, the steam and a liquid (such as rice-water) can enter the mounting chamber 11 through steam inlet 12. The steam can flow through the first passage 41 and flow out through the steam outlet 13. The liquid can pass through a part of the first passage 41, and can slide down on the bottom wall 111 of the valve base 20 along the barrier member 30 due to large weight of the liquid, such that the liquid can flow back to the steam inlet 12.

In the steam valve 1 for the cooking utensil according to embodiments of the present disclosure, by disposing the barrier member 30 in the mounting chamber 11, the barrier member 30 can well change a flow passage structure inside the mounting chamber 11, and can be configured to guide a flow direction of the steam in the mounting chamber 11, such that the steam can be well discharged from the mounting chamber 11; furthermore, the barrier member 30 can have a barrier effect on the liquid such as the rice-water, the liquid can flow back along the barrier member 30, such that the back flow of the liquid in the mounting chamber 11 can be sped up, spill-proof effect of the steam valve 1 during a boiling stage can be greatly improved; and meanwhile, the barrier member 30 has a simple structure and arrangement, a low cost and is easy to achieve.

As illustrated in FIG. 2, the barrier member 30 is connected to at least one of the bonnet 10 and the valve base 20. It could be understood that, the barrier member 30 is located in the mounting chamber 11, the barrier member 30 can be connected to the bonnet 10, the barrier member 30 can also be connected to the valve base 20, or an end of the barrier member 30 can be connected to the bonnet 10 and the other end of the barrier member 30 can be connected to the valve base 20.

As illustrated in FIGS. 8 to 13, according to some embodiments of the present disclosure, the blocking piece 310 may be a flat plate or an arc shaped plate. Either the flat plate or the arc shaped plate can form a barrier effect on the liquid, and the liquid needs to flow over the blocking piece 310 when flowing through the barrier member 30. The flat plate or the arc shaped plate may also define a passage in the mounting chamber 11 for guiding the steam. Further, viewing from a direction from the steam inlet 12 to the steam outlet 13, the arc shaped plate is protruded 15 towards the steam outlet 13. It could be understood that, a center of curvature of the arc shaped plate and the steam inlet 12 are located at the same side of the arc shaped plate. Thus, the arc shaped plate can guide the liquid to flow towards the steam inlet 12. Further, the arc shaped plate may extend in a circumferential direction of the steam inlet 12.

Figure 5:
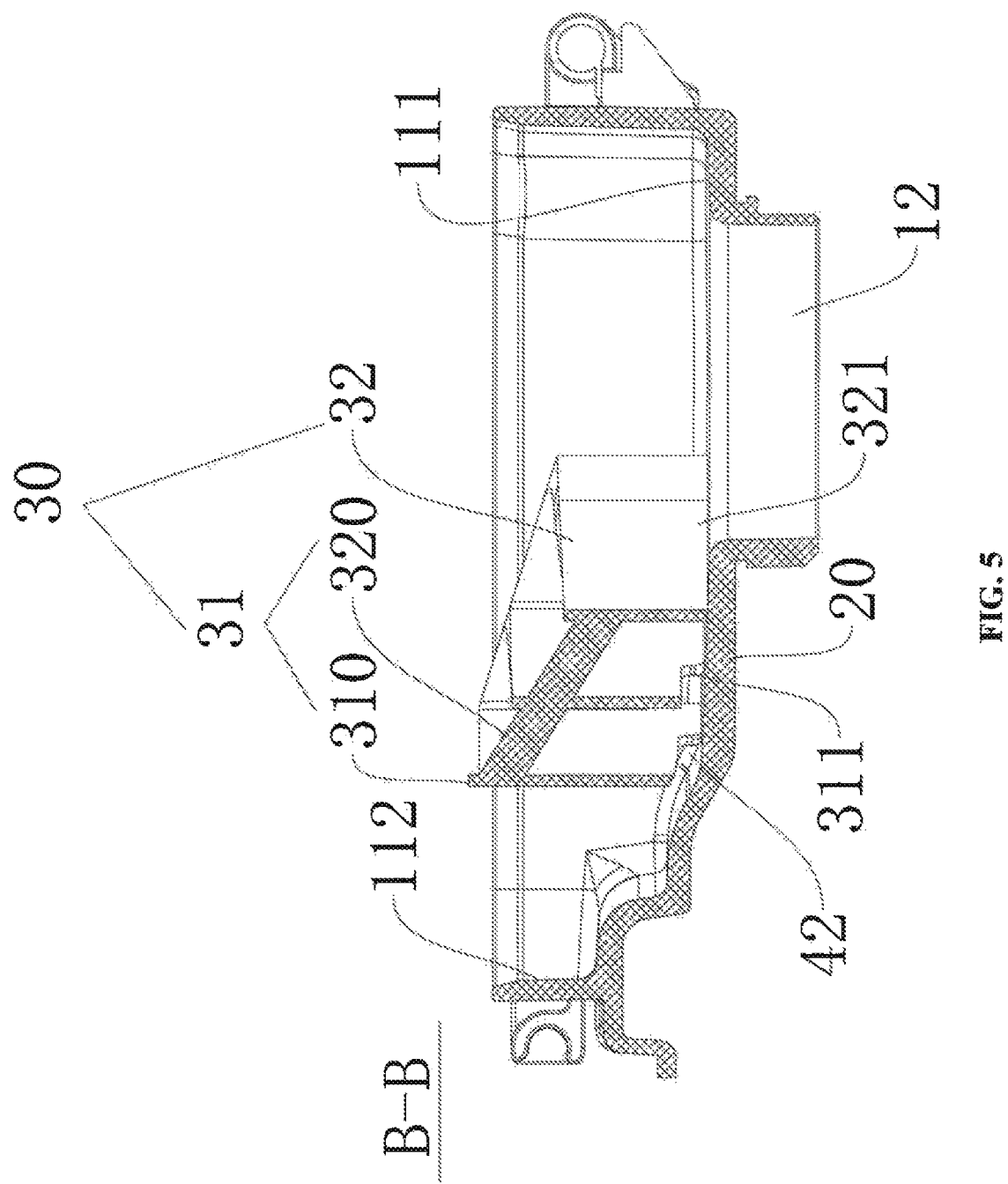
FIG. 5 is a schematically partial view of a section of a steam valve of a cooking utensil according to an embodiment of the present disclosure.
Figure 11:
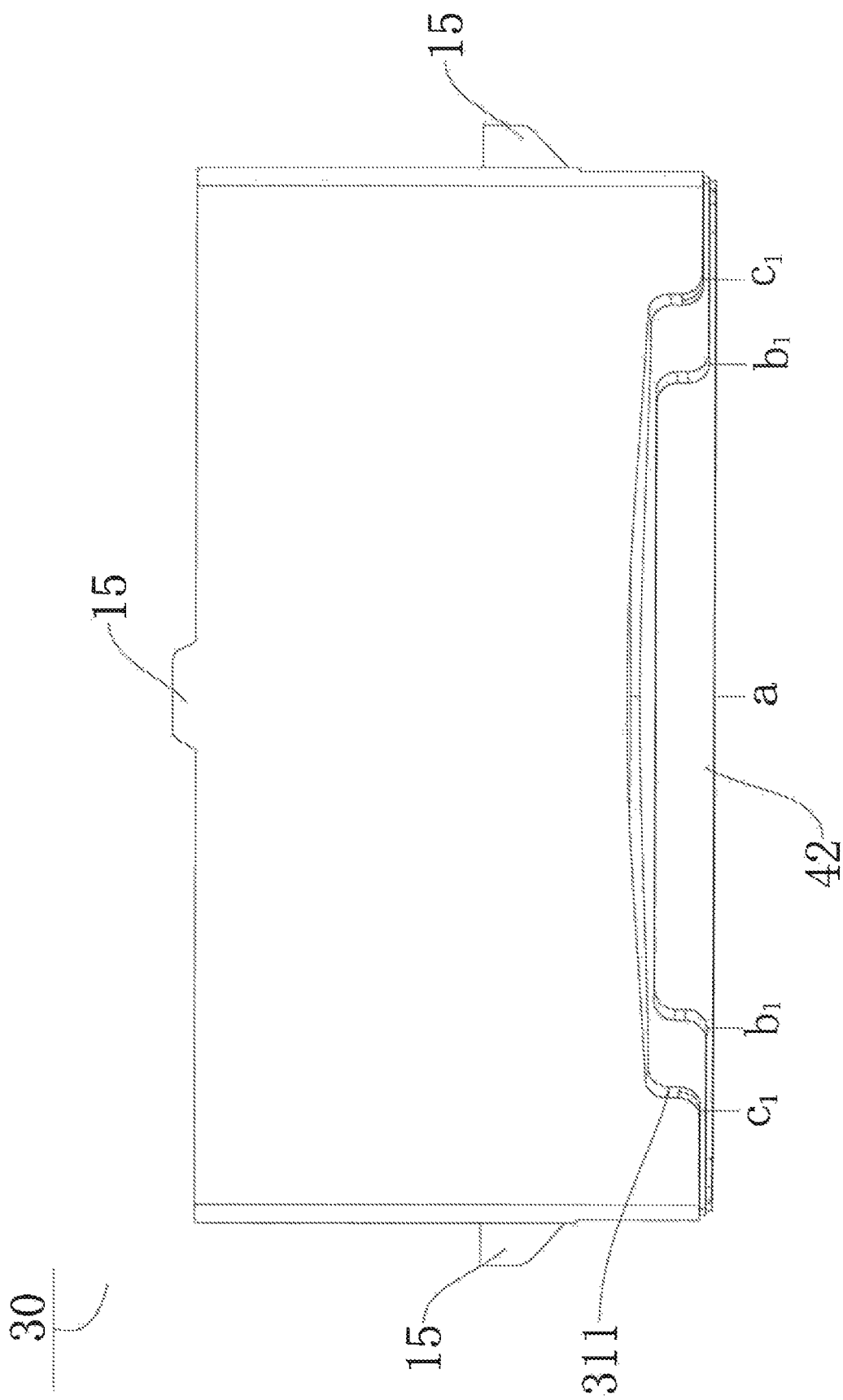
FIG. 11 is a schematic view of a barrier member of a steam valve of a cooking utensil according to an embodiment of the present disclosure.

As illustrated in FIGS. 2, 5 and 11, according to some embodiments of the present disclosure, the other end of the barrier member 30 and the bottom wall 111 of the valve base 20 may have a second passage 42 therebetween for flowing of the liquid. It could be understood that, at least part of an end surface of the barrier member 30 adjacent to the bottom wall 111 can be spaced apart from the bottom wall 111 to define the second passage 42, the liquid such as the rice-water can flow to the bottom wall 11 along the barrier member 30 after flowing through a part of the first passage 41, and flow through the second passage 42, due to the influence of gravity. Thus, the second passage 42 can guide the flowing of the liquid, thereby preventing the liquid from being retained at the barrier member 30.

Figure 8:
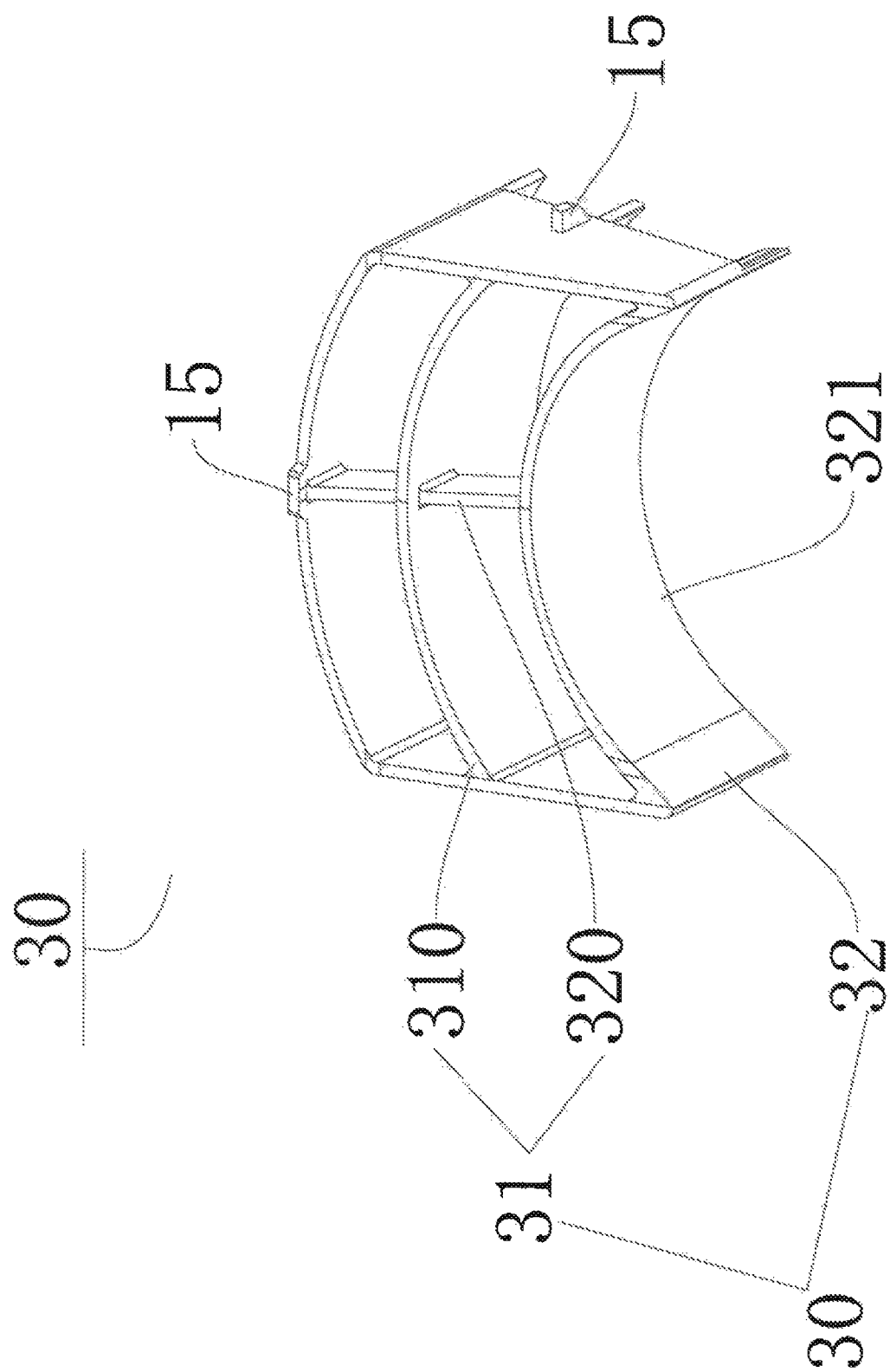
FIG. 8 is a schematic view of a barrier member of a steam valve of a cooking utensil according to an embodiment of the present disclosure.
Figure 9:
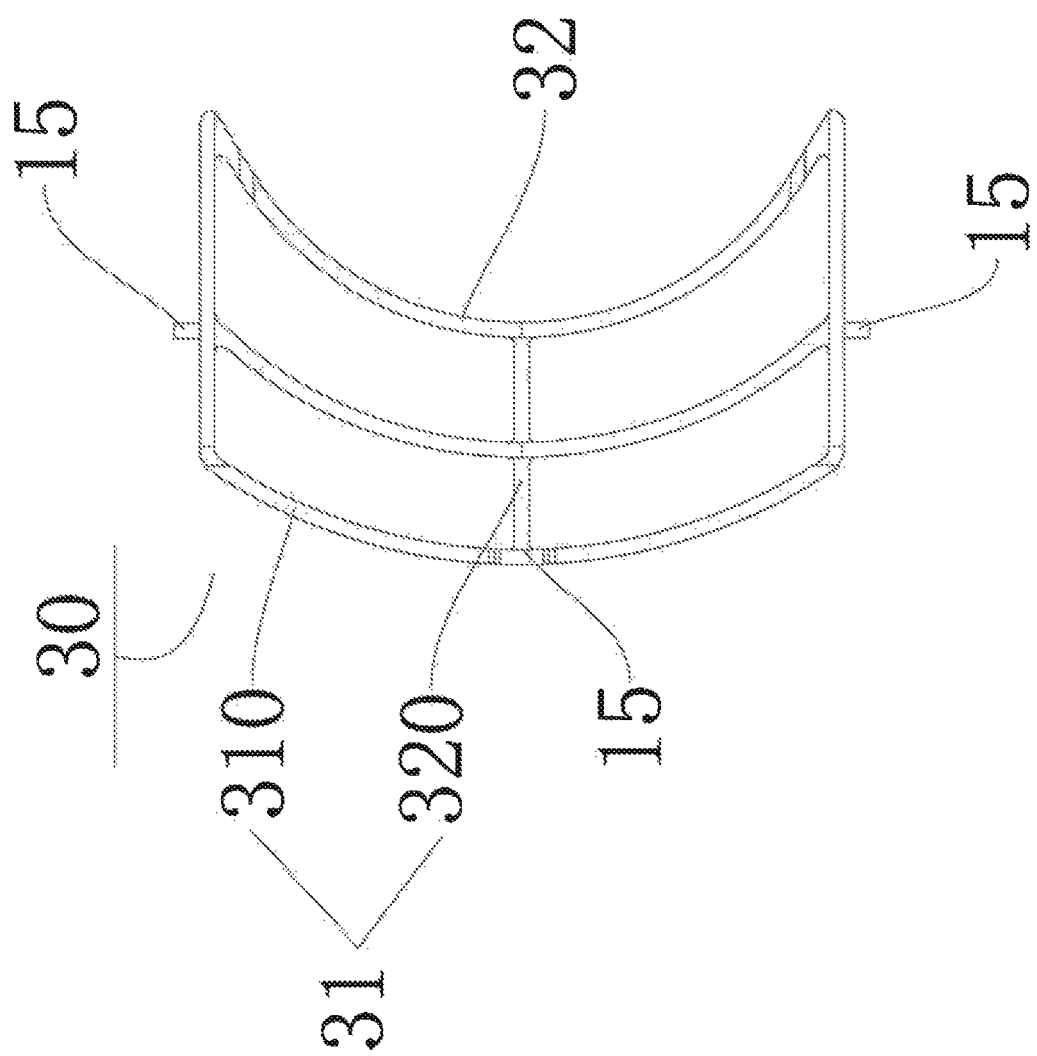
FIG. 9 is a schematic view of a barrier member of a steam valve of a cooking utensil according to an embodiment of the present disclosure.
Figure 10:
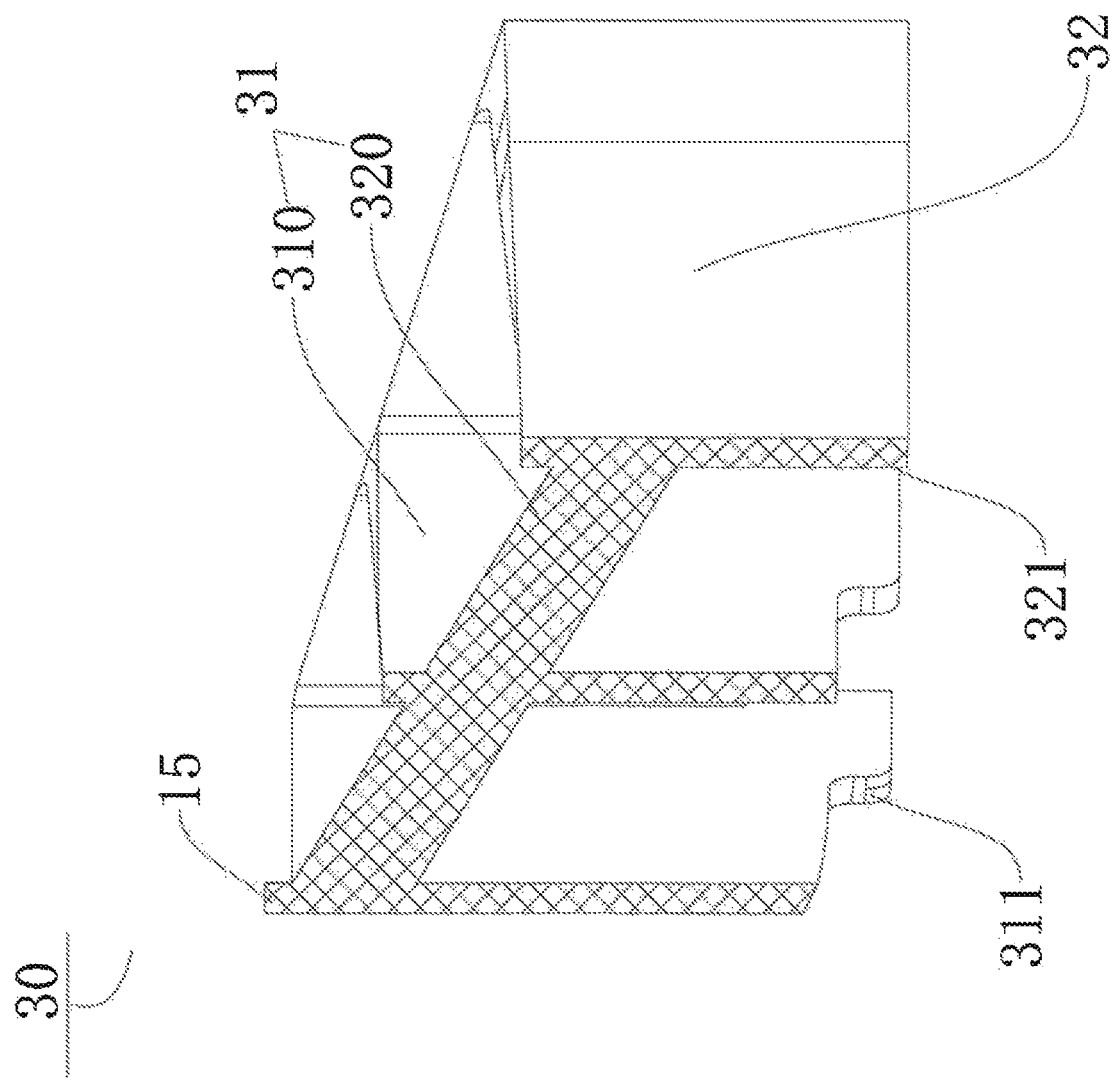
FIG. 10 is a schematic view of a section of a barrier member of a steam valve of a cooking utensil according to an embodiment of the present disclosure.
Figure 13:
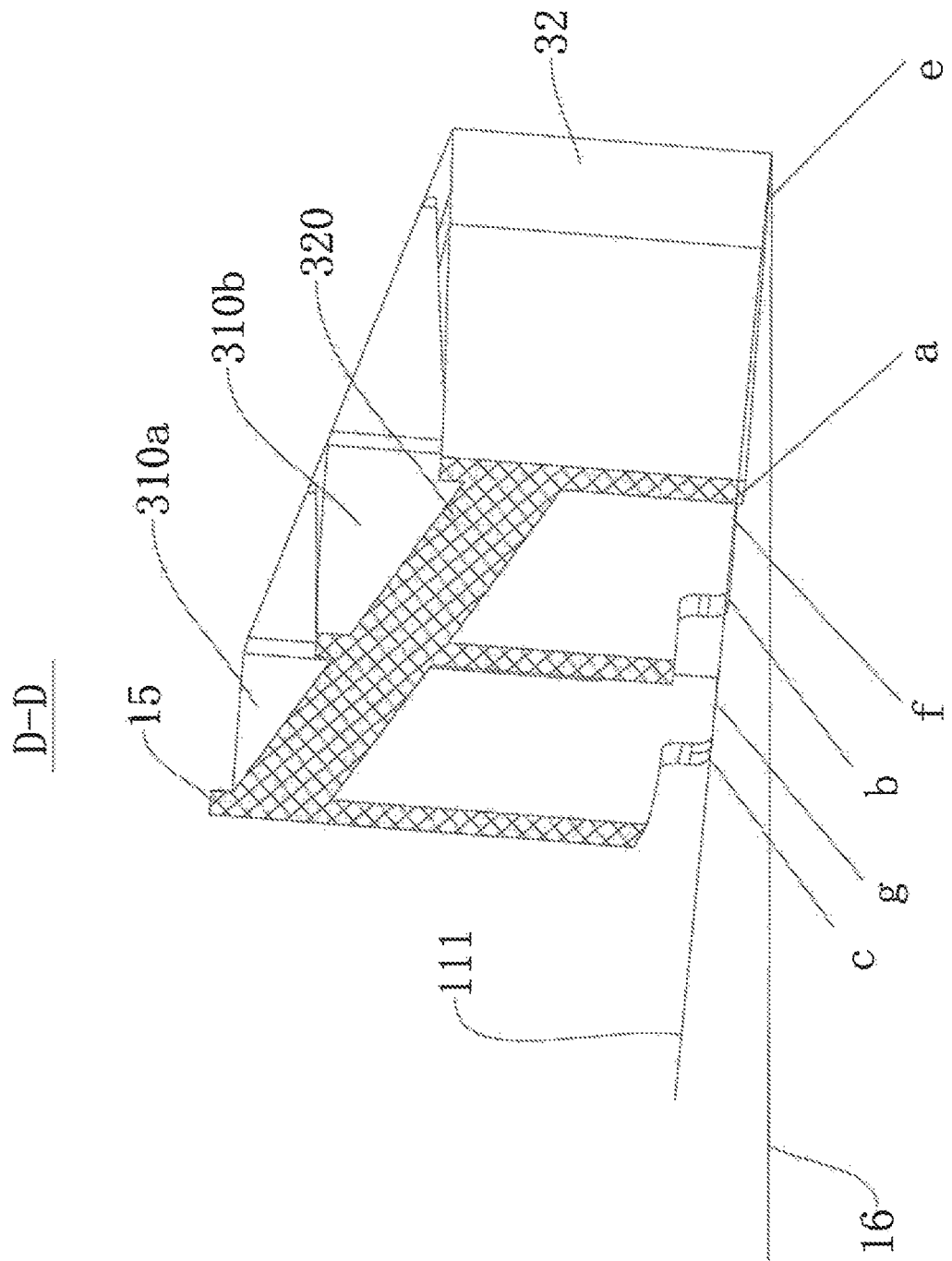
FIG. 13 is a schematic view of a barrier member of a steam valve of a cooking utensil according to an embodiment of the present disclosure.

As illustrated in FIGS. 8, 10 and 13, according to further embodiments of the present disclosure, the blocking piece 310 has a notch 311, the notch 311 and the bottom wall 111 of the valve base 20 define the second passage 42 therebetween, a plurality of blocking pieces 310 is provided, and the plurality of blocking pieces 310 is distributed at intervals in an extending direction of the second passage 42. The barrier member 30 further includes a reinforcing rib 320, any two adjacent blocking pieces 310 are connected to each other by the reinforcing rib 320. In other words, the barrier member 30 may include a plurality of blocking pieces 310 and a plurality of reinforcing ribs 320, in the direction from the steam inlet 12 to the steam outlet 13, the plurality of blocking pieces 310 is arranged at intervals, any two adjacent blocking pieces 310 may be provided with the reinforcing rib 320 therebetween, an end of the reinforcing rib 320 is connected to one blocking piece 310, and the other end of the reinforcing rib 320 is connected to the other blocking piece 310, and the plurality of reinforcing ribs 320 may connect the plurality of blocking pieces 310 together to form a whole. An end of each blocking piece 310 adjacent to the bottom wall 111 has the notch 311, a plurality of notches 311 of the plurality of blocking pieces 310 and the bottom wall 111 may define the second passage 42.

Thus, the liquid such as the rice-water can flow over one or the plurality of blocking pieces 310, the blocking piece 310 can form the barrier to the liquid, reduce a flow velocity of the liquid, and decrease flowing inertia of the liquid, such that, under the influence of gravity, the liquid can flow to the bottom wall 111 along the blocking piece 310, and flow to the second passage 41 through the notch 311, the liquid thus can flow back to the steam inlet 12, thereby avoiding a situation that the liquid flows to the steam outlet 13 to form a spill of the liquid.

As illustrated in FIGS. 2, 5, 10 and 13, in some embodiments of the present disclosure, the reinforcing rib 320 may be located at an end of the blocking piece 310 adjacent to the bonnet 10. It could be understood that, the reinforcing rib 320 between any two adjacent blocking pieces 310 is adjacent to a top end of the blocking piece 310. Thus, in a flow direction of the liquid, the top end of the blocking piece 310 is located upstream of a bottom end of the blocking piece 310. The liquid at the top end of the blocking piece 310 forms foam due to the presence of the steam and its own high temperature, and the reinforcing rib 320 can have a deforming effect. Furthermore, the arrangement of the reinforcing rib 320 is facilitated, and the arrangement of the reinforcing rib 320 is prevented from influencing the arrangement of the notch 311.

As illustrated in FIGS. 8, 10 and 13, in some embodiments of the present disclosure, the barrier member 30 may further include a barrier portion 32, the barrier portion 32 is spaced apart from the blocking piece 310, the barrier portion 32 may be located at a side of the blocking piece 310 adjacent to the steam inlet 12, and an end of the barrier portion 32 adjacent to the valve base 20 is configured to be a guide section 321 to guide the liquid to the steam inlet 12. It could be understood that, the barrier portion 32 is located between the blocking piece 310 and the steam inlet 12, the plurality of blocking pieces 310 is provided at a side of the other barrier portion 32, the steam inlet 12 is provided at the other side of the barrier portion 32, the barrier portion 32 is spaced apart from the steam inlet 12 and the blocking piece 310 separately, a bottom end of the barrier portion 32 is in contact with the bottom wall 111 of the valve base 20, the liquid flowing out of the second passage 42 can flow to the bottom end of the barrier portion 32, and the bottom end of the barrier portion 32 can guide the flowing of the liquid. Thus, the barrier portion 32 can block direct communication between the second passage 42 and the steam inlet 12, and prevent the liquid flowing out of the steam inlet 12 from directly flowing from the steam inlet 12 to the second passage 42.

In further embodiments of the present disclosure, the guide section 321 may be connected to the bottom wall 111. Thus, the barrier portion 32 can be connected to the bottom wall 111. Further, the guide section 321 may be snapped with the bottom wall 111. For example, the bottom wall 111 may define a strip-shaped groove, and the end of the guide section 321 adjacent to the bottom wall 111 is configured to be snapped in the strip-shaped groove. In some examples of the present disclosure, the barrier portion 32 may be arc shaped plate. Thus, the guide section 321 may be formed into an arc shape, such that the guide section can guide the flow direction of the liquid.

As illustrated in FIG. 1, in some examples of the present disclosure, a part of the inner surface of the bonnet 10 and a part of the inner surface of the valve base 20 cooperatively constitute the circumferential wall 112 of the mounting chamber 11, and an end surface of the barrier portion 32 opposite to the circumferential wall 112 is spaced apart from the circumferential wall 112 to form a third passage 43. Thus, the third passage 43 may be configured to communicate the guide section 321 with the steam inlet 12, the guide section 321 can guide the liquid to flow towards the third passage 43 and flow back from the third passage 43 to the steam inlet 12. In further embodiments of the present disclosure, a distance between the barrier portion 32 and the circumferential wall 112 is 2 mm≤d≤3 mm.

The cooking utensil according to embodiments of the present disclosure includes a steam valve, and the steam valve is a steam valve 1 according to the above-described.

As for the cooking utensil according to embodiments of the present disclosure, by disposing the barrier member 30 in the mounting chamber 11, the barrier member 30 can well change the flow passage structure inside the mounting chamber 11, and can be configured to guide the flow direction of the steam in the mounting chamber 11, such that the steam can be well discharged from the mounting chamber 11; furthermore, the barrier member 30 can have the barrier effect on the liquid such as the rice-water, the liquid can flow back along the barrier member 30, such that the back flow of the liquid in the mounting chamber 11 can be sped up, the spill-proof effect of the steam valve 1 during the boiling stage can be greatly improved; and meanwhile, the barrier member 30 has a simple structure and arrangement, a low cost and is easy to achieve.

As illustrated in FIGS. 1 to 14, a steam valve 1 for a cooking utensil 101 according to embodiments of the present disclosure includes a bonnet 10, a valve base 20 and a barrier member 30.

Specifically, as illustrated in FIG. 2, the bonnet 10 and the valve base 20 form a mounting chamber 11, a part of an inner surface of the bonnet 10 constitutes a top wall 110 of the mounting chamber 11, a part of an inner surface of the valve base 20 constitutes a bottom wall 111 of the mounting chamber 11, the other part of the inner surface of the bonnet 10 and the other part of the inner surface of the valve base 20 cooperatively constitute a circumferential wall 112 of the mounting chamber 11. As illustrated in FIGS. 2-3, and 5-7, the valve base 20 has a steam inlet 12, and at least one of the valve base 20 and the bonnet 10 has a steam outlet 13. The barrier member 30 is located in the mounting chamber 11, the barrier member 30 is located between the steam inlet 12 and the steam outlet 13, an end of the barrier member 30 and the top wall 110 define a first passage 41 therebetween, the steam can flow from the steam inlet 12 via the first passage 41 to the steam outlet 13, and the bottom wall 111 of the valve base 20 corresponding to the barrier member 30 is disposed obliquely such that the liquid flows back to the steam inlet 12.

Figure 6:
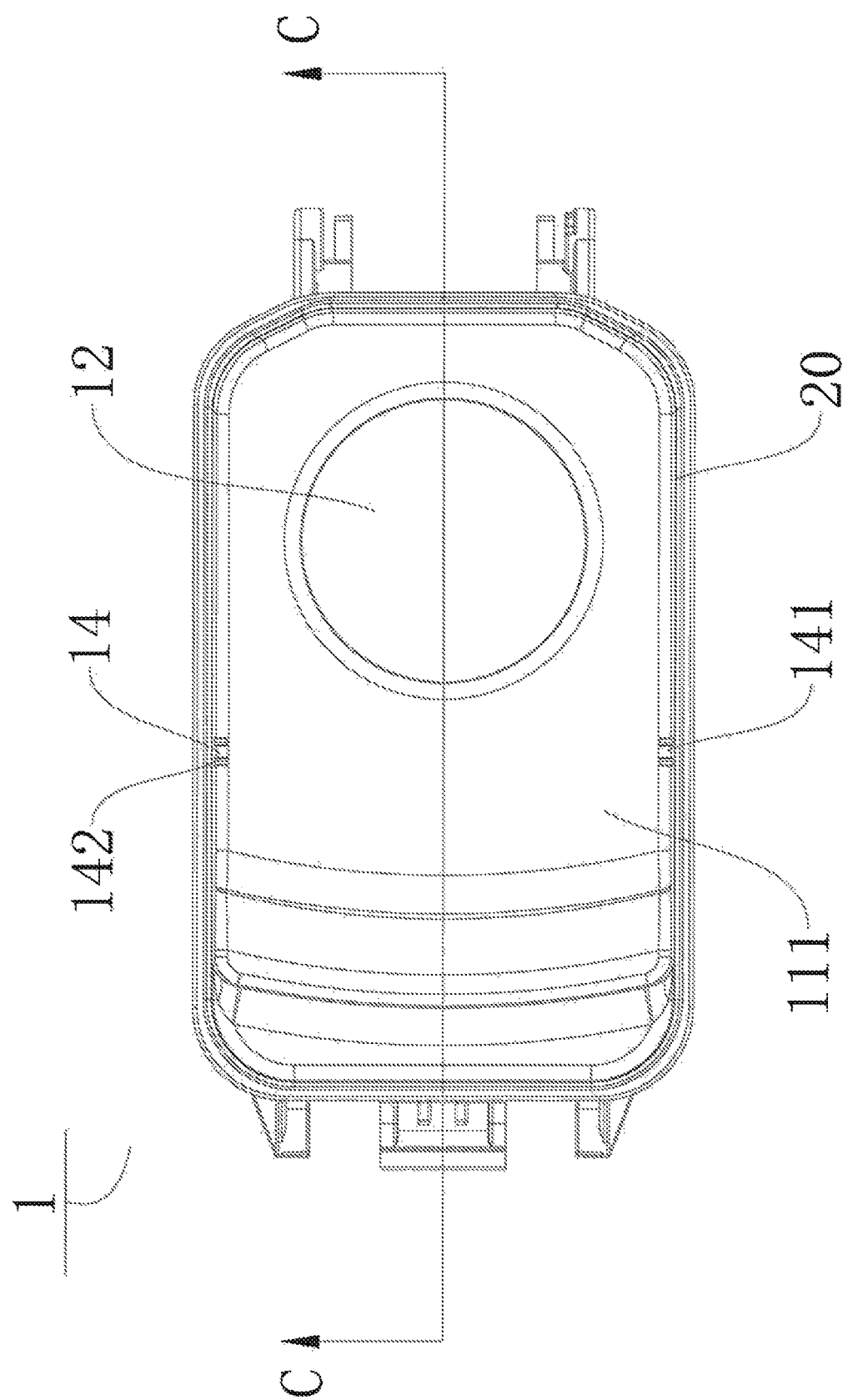
FIG. 6 is a schematic view of a valve base of a steam valve of a cooking utensil according to an embodiment of the present disclosure.
Figure 7:
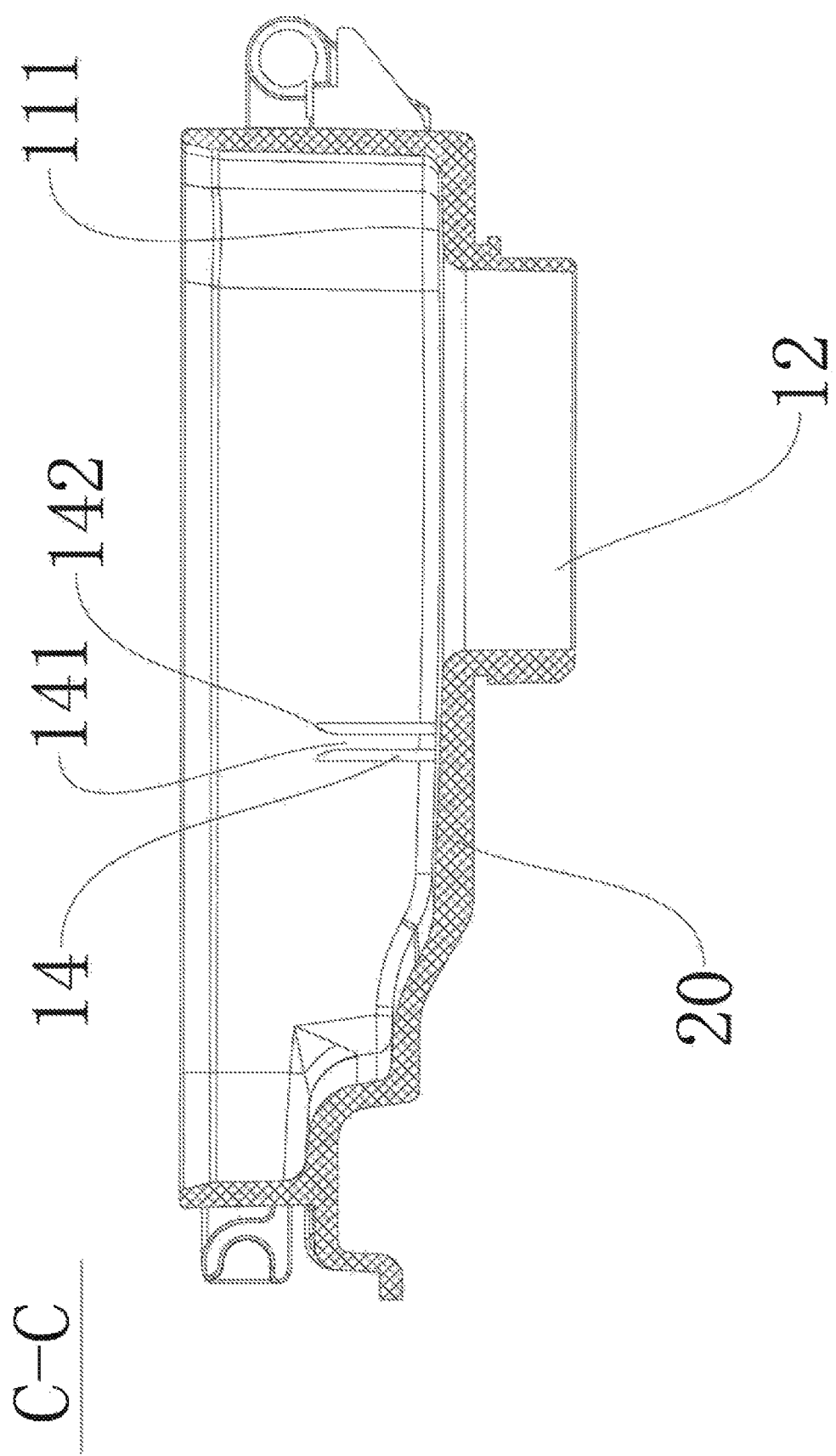
FIG. 7 is a schematic view of a section of a valve base of a steam valve of a cooking utensil according to an embodiment of the present disclosure.

It could be understood that, as illustrated in FIGS. 2-3 and 5-7, the bonnet 10 is connected to the valve base 20, the inner surface of the bonnet 10 and the inner surface of the valve base 20 can define the mounting chamber 11. The valve base 20 is provided with the steam inlet 12, the steam inlet 12 penetrates the valve base 20, and the steam can enter the mounting chamber 11 from an outside of mounting chamber 11 through the steam inlet 12. For example, as illustrated in FIGS. 5-7, the steam inlet 12 may be defined in the bottom wall 111 of the valve base 20. The steam outlet 13 can be defined in the bonnet 10, the steam outlet 13 can also be defined in the valve base 20, and the steam outlet 13 can also be defined cooperatively by a part of the bonnet 10 and a part of the valve base 20. The steam in the mounting chamber 11 can flow out of the mounting chamber 11 through the steam outlet 13.

In a direction from the steam inlet 12 to the steam outlet 13, the barrier member 30 is located between the steam inlet 12 and the steam outlet 13, the barrier member 30 is spaced apart from the steam inlet 12, and the barrier member 30 is also spaced apart from the steam outlet 13. A top end of the barrier member 30 may be spaced apart from the inner surface of the bonnet 10 to form the first passage 41, and the steam in the mounting chamber 11 can flow through the first passage 41. The part of the bottom wall 111 of the valve base 20 provided with the barrier member 30 is disposed obliquely, and can be configured to guide the liquid to flow back to the steam inlet 12.

It should be noted that, the steam and a liquid (such as rice-water) can enter the mounting chamber 11 through steam inlet 12. The steam can flow through the first passage 41 and flow out through the steam outlet 13. The liquid can pass through a part of the first passage 41, and can slide down on the bottom wall 111 of the valve base 20 along the barrier member 30 due to large weight of the liquid, such that the liquid can flow back to the steam inlet 12.

In the steam valve 1 for the cooking utensil according to embodiments of the present disclosure, by disposing the barrier member 30 in the mounting chamber 11, the barrier member 30 can well change the flow passage structure inside the mounting chamber 11, and can be configured to guide the flow direction of the steam in the mounting chamber 11, such that the steam can be well discharged from the mounting chamber 11; furthermore, the barrier member 30 can have the barrier effect on the liquid such as the rice-water, the liquid can flow back along the barrier member 30; moreover, the bottom wall 111 of the valve base 20 is obliquely disposed, the liquid on the bottom wall 111 can be guided to flow towards the steam inlet 12, such that the back flow of the liquid in the mounting chamber 11 can be sped up, the spill-proof effect of the steam valve 1 during the boiling stage can be greatly improved; and meanwhile, the barrier member 30 has the simple structure and arrangement, the low cost and is easy to achieve.

As illustrated in FIG. 2, in some embodiments of the present disclosure, the barrier member 30 is connected to at least one of the bonnet 10 and the valve base 20. It could be understood that, the barrier member 30 is located in the mounting chamber 11, the barrier member 30 can be connected to the bonnet 10, the barrier member 30 can also be connected to the valve base 20, or an end of the barrier member 30 can be connected to the bonnet 10 and the other end of the barrier member 30 can be connected to the valve base 20. Thus, the barrier member 30 can be fixed in the mounting chamber 11.

As illustrated in FIGS. 2, 5 and 11, according to some embodiments of the present disclosure, the other end of the barrier member 30 and the bottom wall 111 of the valve base 20 may have a second passage 42 therebetween for flowing of the liquid. The bottom wall 111 of the valve base 20 include a first inclined section, the first inclined section may be located in the second passage 42, and is configured to guide the liquid to the steam inlet 12. It could be understood that, as illustrated in FIG. 13, the bottom wall 111 of the valve base 20 may have the first inclined section, viewing from the direction from the steam outlet 13 to the steam inlet 12, a vertical distance between the first inclined section and a plane where the top wall 110 of the bonnet 10 is located is gradually increased. In other words, as illustrated in FIG. 13, the cooking utensil is placed on the a horizontal plane 16, viewing from the direction from the steam outlet 13 to the steam inlet 12, a vertical distance between the first inclined section and the horizontal plane 16 is gradually decreased, and the first inclined section is configured to guide the liquid such as the rice-water on the bottom wall 111 to flow towards the steam inlet 12.

At least part of an end surface of the barrier member 30 adjacent to the bottom wall 111 can be spaced apart from the bottom wall 111 to define a second passage 42, due to the influence of gravity, the liquid such as the rice-water can flow to the bottom wall 11 along the barrier member 30 after flowing through a part of the first passage 41 A part of the second passage 42 may form the first inclined section, and the first inclined section may guide the liquid in the second passage 42 to flow towards the steam inlet 12. Thus, the liquid flowing through at least a part of the first passage 41 can enter the second passage 42, and the first inclined section in the second passage 42 can guide the liquid to flow towards the steam inlet 12.

As illustrated in FIGS. 8, 10 and 13, according to further embodiments of the present disclosure, the barrier member 30 may include a flow guide portion 31, and the flow guide portion 31 may include a blocking piece 310 and a reinforcing rib 320. The blocking piece 310 may have a notch 311, the notch 311 and the bottom wall 111 of the valve base 20 may define the second passage 42 therebetween, a plurality of blocking pieces 310 may be provided, and the plurality of blocking pieces 310 is distributed at intervals in an extending direction of the second passage 42. Any two adjacent blocking pieces 310 may be connected to each other by the reinforcing rib 320, and the first inclined section is opposite to the notch 311. In other words, the barrier member 30 may include a plurality of blocking pieces 310 and a plurality of reinforcing ribs 320, in the direction from the steam inlet 12 to the steam outlet 13, the plurality of blocking pieces 310 is arranged at intervals, any two adjacent blocking pieces 310 may be provided with the reinforcing rib 320 therebetween, an end of the reinforcing rib 320 is connected to one blocking piece 310, and the other end of the reinforcing rib 320 is connected to the other blocking piece 310, and the plurality of reinforcing ribs 320 may connect the plurality of blocking pieces 310 together to form a whole.

As illustrated in FIGS. 8, 10 and 13, an end of each blocking piece 310 adjacent to the bottom wall 111 has the notch 311, a plurality of notches 311 of the plurality of blocking pieces 310 and the bottom wall 111 may define the second passage 42. The part of the bottom wall 111 opposite to the notch 311 may form the first inclined section. Thus, the liquid such as the rice-water can flow over one or the plurality of blocking pieces 310, the blocking piece 310 can form the barrier to the liquid, reduce the flow velocity of the liquid, and decrease the flowing inertia of the liquid, such that, under the influence of gravity, the liquid can flow to the bottom wall 111 along the blocking piece 310, and flow to the second passage 41 through the notch 311, the first inclined section in the second passage 42 thus can guide the liquid to flow back towards the steam inlet 12, thereby avoiding the situation that the liquid flows to the steam outlet 13 to form the spill of the liquid.

As illustrated in FIGS. 8 to 13, in some embodiments of the present disclosure, the blocking piece 310 may be a flat plate or an arc shaped plate. Either the flat plate or the arc shaped plate can form a barrier effect on the liquid, and the liquid needs to flow over the blocking piece 310 when flowing through the barrier member 30. The flat plate or the arc shaped plate may also define a passage in the mounting chamber 11 for guiding the steam. Further, viewing from a direction from the steam inlet 12 to the steam outlet 13, the arc shaped plate is protruded 15 towards the steam outlet 13. It could be understood that, a center of curvature of the arc shaped plate and the steam inlet 12 are located at the same side of the arc shaped plate. Thus, the arc shaped plate can guide the liquid to flow towards the steam inlet 12. Further, the arc shaped plate may extend in a circumferential direction of the steam inlet 12.

As illustrated in FIGS. 2, 5, 10 and 13, in some embodiments of the present disclosure, the reinforcing rib 320 may be located at an end of the blocking piece 310 adjacent to the bonnet 10. It could be understood that, the reinforcing rib 320 between any two adjacent blocking pieces 310 may be adjacent to the top end of the blocking piece 310. Thus, in a flow direction of the liquid, the top end of the blocking piece 310 is located upstream of a bottom end of the blocking piece 310. The liquid at the top end of the blocking piece 310 forms foam due to the presence of the steam and its own high temperature, and the reinforcing rib 320 can have a deforming effect. Furthermore, the arrangement of the reinforcing rib 320 is facilitated, and the arrangement of the reinforcing rib 320 is prevented from influencing the arrangement of the notch 311.

As illustrated in FIGS. 8, 10 and 13, in some embodiments of the present disclosure, the barrier member 30 may further include a barrier portion 32, the barrier portion 32 is spaced apart from the flow guide portion 31, the barrier portion 32 may be located at a side of the flow guide portion 31 adjacent to the steam inlet 12, and an end of the barrier portion 32 adjacent to the valve base 20 is configured to be a guide section 321 to guide the liquid to the steam inlet 12. It could be understood that, the barrier portion 32 is located between the flow guide portion 31 and the steam inlet 12, the barrier portion 32 is spaced apart from the steam inlet 12 and the flow guide portion 31 separately, the bottom end of the barrier portion 32 may be in contact with the bottom wall 111 of the valve base 20, the liquid flowing out of the second passage 42 can flow to the bottom end of the barrier portion 32, and the bottom end of the barrier portion 32 can guide the flowing of the liquid. Thus, the barrier portion 32 can block direct communication between the second passage 42 and the steam inlet 12, and prevent the liquid flowing out of the steam inlet 12 from directly flowing from the steam inlet 12 to the second passage 42.

In further embodiments of the present disclosure, the guide section 321 may be connected to the bottom wall 111 of the valve base 20. Thus, the barrier portion 32 can be connected to the bottom wall 111. Further, the guide section 321 may be snapped with the bottom wall 111. For example, the bottom wall 111 may define a strip-shaped groove, and the end of the guide section 321 adjacent to the bottom wall 111 is configured to be snapped in the strip-shaped groove.

Further, as illustrated in FIGS. 8 to 13, the barrier portion 32 may be a flat plate or an arc shaped plate. Either the flat plate or the arc shaped plate can form a barrier effect on the liquid, and the liquid needs to flow over the barrier portion 32 when flowing through the barrier member 30. The flat plate or the arc shaped plate may also define a passage in the mounting chamber 11 for guiding the steam. Further, viewing from a direction from the steam inlet 12 to the steam outlet 13, the arc shaped plate is protruded 15 towards the steam outlet 13. It could be understood that, a center of curvature of the arc shaped plate and the steam inlet 12 are located at the same side of the arc shaped plate. Thus, the arc shaped plate can guide the liquid to flow towards the steam inlet 12. Further, the arc shaped plate extends in the circumferential direction of the steam inlet 12.

As illustrated in FIG. 1, in some examples of the present disclosure, a part of the inner surface of the bonnet 10 and a part of the inner surface of the valve base 20 cooperatively constitute the circumferential wall 112 of the mounting chamber 11, and an end surface of the barrier portion 32 opposite to the circumferential wall 112 is spaced apart from the circumferential wall 112 to form a third passage 43. Thus, the third passage 43 may be configured to communicate the guide section 321 with the steam inlet 12, the guide section 321 can guide the liquid to flow towards the third passage 43 and flow back from the third passage 43 to the steam inlet 12. In further examples of the present disclosure, the distance between the barrier portion 32 and the circumferential wall 112 may be 2 mm≤d≤3 mm. Thus, the rice-water flowing out of the steam inlet 12 a large volume due to high temperature and presence of foam, cannot pass between the barrier portion 32 and the circumferential wall 112, the steam can pass between the barrier portion 32 and the circumferential wall 112, the rice-water will be deformed after flowing over the barrier member 30, the volume will become smaller, such that the rice-water can pass between the barrier portion 32 and the circumferential wall 112, and flow back to the steam inlet 12.

Furthermore, the bottom wall 111 of the valve base 20 may include at least one second inclined section, and the second inclined section can be inclined towards the third passage 43, so as to guide the liquid into the third passage 43. It could be understood that, at least a part of the bottom wall 111 forms the second inclined section, and the second inclined section is configured to guide the liquid on the bottom wall 111 adjacent to the guide section 321 to incline towards the third passage 43. For example, as illustrated in FIG. 13, the bottom wall 111 may include two second inclined sections, the two second inclined sections are symmetrical relative to a center of the bottom wall 111, the cooking utensil is placed on the horizontal plane 16 in a use state, viewing in a direction from a middle position of the bottom wall 111 to the third passages 43 at two sides of the barrier portion 32, a distance between the bottom wall 111 and the horizontal plane 16 is gradually decreased. Thus, the second inclined section can further guide the liquid at the guide section 321 to flow towards the third passage 43 and then flow towards the steam inlet 12.

Figure 12:
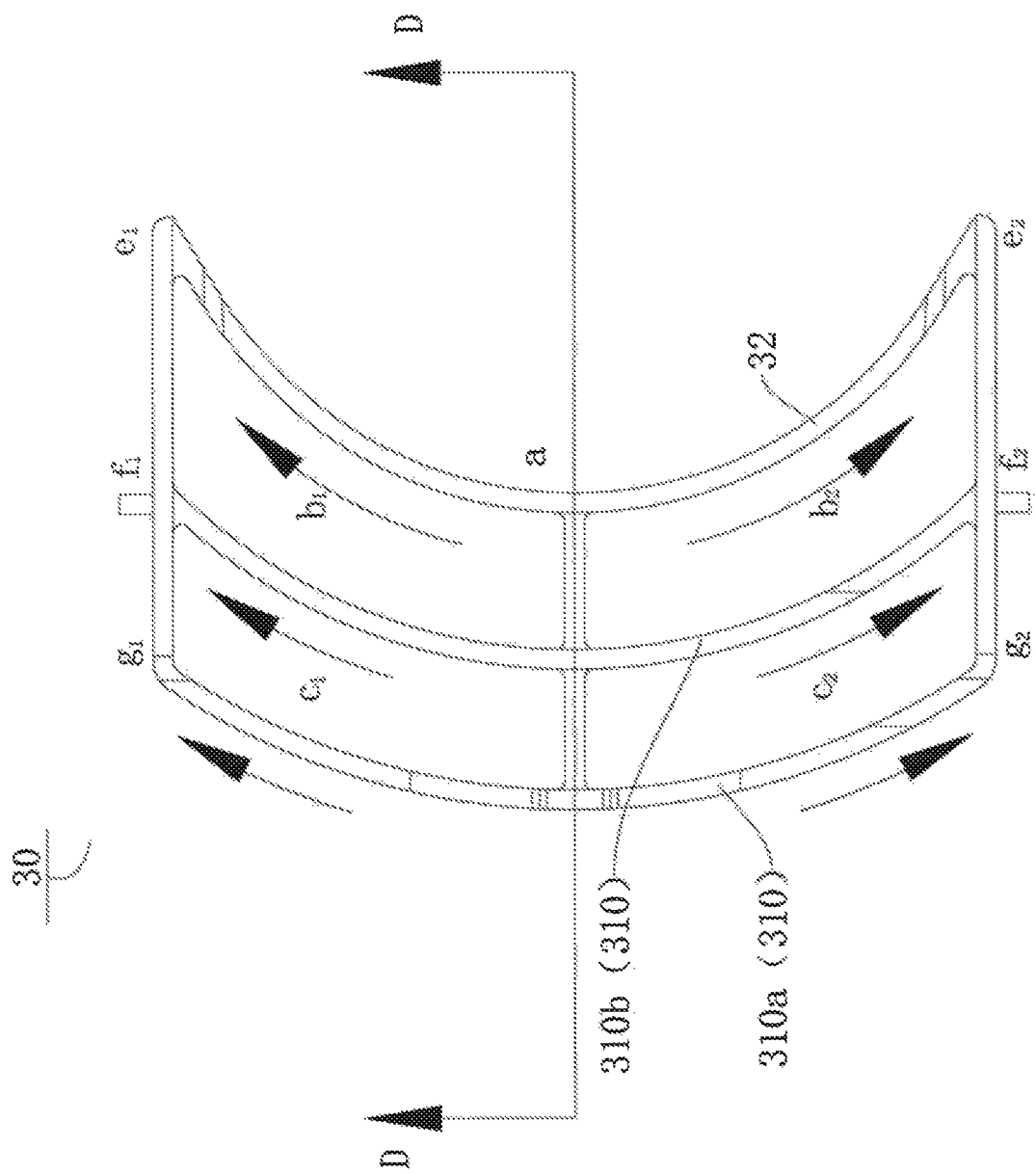
FIG. 12 is a schematic view of a barrier member of a steam valve of a cooking utensil according to an embodiment of the present disclosure.

As illustrated in FIGS. 11 to 13, in some embodiments of the present disclosure, a contact point between the barrier portion 32 and the bottom wall 111 includes a point a and a point e, the point a is adjacent to a middle position of the barrier portion 32, the point e is adjacent to the third passage 43, a distance between the point a and the horizontal plane is ha, and a distance between the point e and the horizontal plane is he. The flow guide portion 31 includes a first blocking piece 310a and a second blocking piece 310b, the second blocking piece 310b is located between the first blocking piece 310a and the barrier portion 32, a contact point between the second blocking piece and the bottom wall 111 includes a point b and a point f, the point b is adjacent to the notch 311, the point f is adjacent to the third passage 43, a distance between the point b and the horizontal plane is hb, and a distance between the point f and the horizontal plane is hf. A contact point between the first blocking piece 310a and the bottom wall 111 includes a point c and a point g, the point c is adjacent to the notch 311, the point g is adjacent to the third passage 43, a distance between the point c and the horizontal plane is hc, and a distance between the point f and the horizontal plane is hg. The ha, he, hb, hf, hc and hg meet the following relation: ha>he, hb>hf, hc>hg, hg<hf<he. Thus, the back flow of the rice-water can be achieved.

As illustrated in FIG. 1, in some embodiments of the present disclosure, an end surface of the flow guide portion 31 opposite to the circumferential wall 112 is spaced apart from the circumferential wall 112 to form a fourth passage 44, and the fourth passage 44 may be communicated with the steam inlet 12 and the steam outlet 13. For example, the end surface of the flow guide portion 31 opposite to the circumferential wall 112 is spaced apart from the circumferential wall 112 to form the fourth passage 44, the end surface of the barrier portion 32 opposite to the circumferential wall 112 is spaced apart from the circumferential wall 112 to form the third passage 43, an end of the third passage 43 is communicated with an end of the fourth passage 44, the other end of the third passage 43 is communicated with the steam inlet 12, and the other end of the fourth passage 44 is communicated with the steam outlet 13. Thus, the steam can flow from the steam inlet 12 to the third passage 43, and flow from the fourth passage 44 to the steam outlet 13. In further embodiments of the present disclosure, a distance between the flow guide portion 31 and the circumferential wall 112 may be 2 mm≤d≤3 mm. Thus, the rice-water flowing out of the steam inlet 12 has the large volume due to high temperature and the presence of foam, cannot pass between the flow guide portion 31 and the circumferential wall 112, and the steam can pass between the flow guide portion 31 and the circumferential wall 112.

The cooking utensil according to embodiments of the present disclosure includes a steam valve, and the steam valve is a steam valve 1 according to the above-described.

In the steam valve 1 for the cooking utensil according to embodiments of the present disclosure, by disposing the barrier member 30 in the mounting chamber 11, the barrier member 30 can well change the flow passage structure inside the mounting chamber 11, and can be configured to guide the flow direction of the steam in the mounting chamber 11, such that the steam can be well discharged from the mounting chamber 11; furthermore, the barrier member 30 can have the barrier effect on the rice-water, the rice-water can flow back along the barrier member 30; moreover, the bottom wall 111 of the valve base 20 is obliquely disposed, the liquid on the bottom wall 111 can be guided to flow towards the steam inlet 12, such that the back flow of the rice-water in the mounting chamber 11 can be sped up, the spill-proof effect of the steam valve 1 during the boiling stage can be greatly improved; and meanwhile, the barrier member 30 has the simple structure and arrangement, the low cost and is easy to achieve.

The steam valve 1 according to embodiments of the present disclosure will be described in the following with reference to FIGS. 1-13. It could be understood that, the following description is exemplary illustration, but does not specifically limit the present disclosure.

As illustrated in FIGS. 1 to 13, the steam valve 1 for the cooking utensil according to embodiments of the present disclosure includes a bonnet 10, a valve base 20 and a barrier member 30.

Specifically, as illustrated in FIG. 2, the bonnet 10 is snapped with the valve base 20, an inner surface of the bonnet 10 and an inner surface of the valve base 20 can define the mounting chamber 11. A part of the inner surface of the bonnet 10 constitutes a top wall 110 of the mounting chamber 11, a part of the inner surface of the valve base 20 constitutes a bottom wall 111 of the mounting chamber 11, the other part of the inner surface of the bonnet 10 and the other part of the inner surface of the valve base 20 cooperatively constitute a circumferential wall 112 of the mounting chamber 11. As illustrated in FIGS. 2-3 and 5-7, the bottom wall 111 of the valve base 20 may be provided with a steam inlet 12, the steam inlet 12 penetrates the valve base 20, the bonnet 10 may be provided with a steam outlet 13, the steam can enter the mounting chamber 11 from an outside of the mounting chamber 11 through the steam inlet 12, and the steam in the mounting chamber 11 can flow out of the mounting chamber 11 through the steam outlet 13.

As illustrated in FIG. 2, the barrier member 30 may be a plastic member or a metal member, the barrier member 30 is located in the mounting chamber 11. In a direction that the steam flows from the steam inlet 12 to the steam outlet 13, the barrier member 30 is located between the steam inlet 12 and the steam outlet 13, the barrier member 30 is spaced apart from the steam inlet 12, and the barrier member 30 is also spaced apart from the steam outlet 13. As illustrated in FIGS. 2-8 and 11, a middle position of the barrier member 30 adjacent to the top wall 110 may be provided with a protrusion 15, a position of the top wall 110 opposite to the protrusion 15 may define a snap groove 14, two ends of the barrier member 30 may be provided with one protrusion 15 separately, a position of the circumferential wall 112 opposite to the protrusion 15 may define a snap groove 14, the protrusion 15 may be snapped in the snap groove 14, a free end of the snap groove 14 may be an open end 141, and the open end 141 may have a guiding inclined surface 142.

As illustrated in FIG. 2, an upper end of the barrier member 30 may be spaced apart from the inner surface of the bonnet 10 to form a first passage 41, and the steam in the mounting chamber 11 can flow through the first passage 41. The steam and the rice-water can enter the mounting chamber 11 through steam inlet 12, the steam can flow through the first passage 41 and flow out through the steam outlet 13. The rice-water can pass through a part of the first passage 41, and can slide down on the bottom wall 111 of the valve base 20 along the barrier member 30 due to the large weight of the rice-water.

As illustrated in FIG. 13, the bottom wall 111 of the valve base 20 may have a first inclined section, viewing from the direction from the steam outlet 13 to the steam inlet 12, a vertical distance between the first inclined section and a plane where the top wall 110 of the bonnet 10 is located is gradually increased. In other words, the cooking utensil is placed on the a horizontal plane 16, viewing in the direction from the steam outlet 13 to the steam inlet 12, a vertical distance between the first inclined section and the horizontal plane 16 is gradually decreased, and the first inclined section is configured to guide the rice-water on the bottom wall 111 to flow towards the steam inlet 12.

As illustrated in FIGS. 8, 10 and 13, the barrier member 30 may include the flow guide portion 31 and the barrier portion 32, and the flow guide portion 31 and the barrier portion 32 are distributed at intervals along a radial direction of the steam inlet 12. The flow guide portion 31 includes two blocking pieces 310 and two reinforcing ribs 320, in the direction from the steam inlet 12 to the steam outlet 13, two blocking pieces 310 are arranged at intervals towards the radial direction of the steam inlet 12, one reinforcing rib 320 is located between the two blocking pieces 310, and the other reinforcing rib 320 is located between the flow guide portion 31 and the barrier portion 32. Therefore, the two blocking pieces 310 and the barrier portion 32 can be connected together to form a whole. The reinforcing rib 320 may be located at the end of the blocking piece 310 adjacent to the bonnet 10.

As illustrated in FIGS. 8, 10 and 13, the two blocking pieces 310 may have completely the same shape, and may be arc shaped plates. Viewing in the direction from the steam inlet 12 to the steam outlet 13, the arc shaped plate is protruded 15 towards the steam outlet 13, and the arc shaped plate extends towards the circumferential direction of the steam inlet 12. The barrier portion 32 may also be an arc shaped plate, viewing in the direction from the steam inlet 12 to the steam outlet 13, the arc shaped plate is protruded 15 towards the steam outlet 13, and the arc shaped plate extends towards the circumferential direction of the steam inlet 12.

As illustrated in FIGS. 8, 10 and 13, ends of the two blocking pieces 310 adjacent to the bottom wall 111 each have the notch 311, the notch 311 and the bottom wall 111 may define a second passage 42. The bottom end of the barrier portion 32 is in contact with the bottom wall 111 of the valve base 20, and the rice-water flowing out through the second passage 42 can flow to the bottom end of the barrier portion 32. A part of bottom wall 111 adjacent to the barrier portion 32 may form two second inclined sections, the two second inclined sections are symmetrical relative to a center of the bottom wall 111, the cooking utensil is placed on the horizontal plane 16 in a use state, viewing in a direction from a middle position of the bottom wall 111 to the third passages 43 at two sides of the barrier portion 32, a distance between the bottom wall 111 and the horizontal plane 16 is gradually decreased. The second inclined section can guide the rice-water to flow towards two ends of the barrier portion 32.

Figure 14:
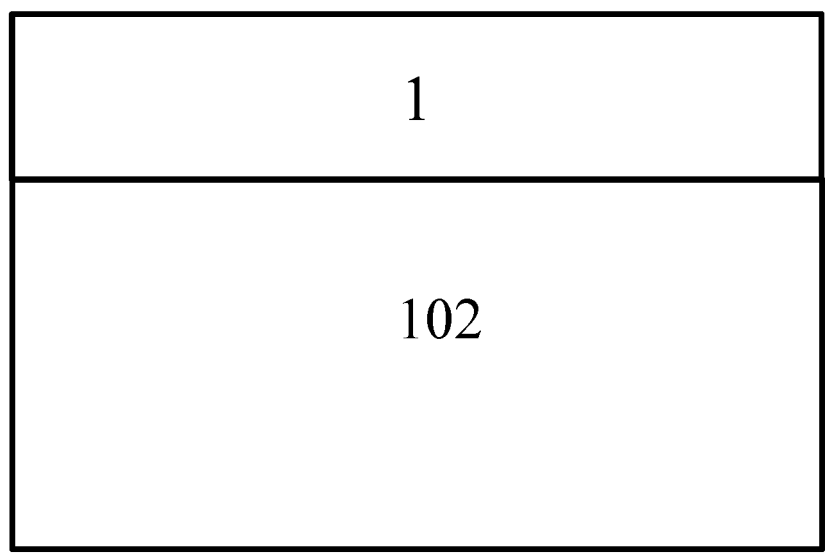
FIG. 14 is a schematic view of a cooking utensil according to an embodiment of the present disclosure.

As illustrated in FIG. 1 and FIG. 14, the end surface of the barrier portion 32 opposite to the circumferential wall 112 is spaced apart from the circumferential wall 112 to form the third passage 43. The distance between the barrier portion 32 and the circumferential wall 112 may be 2 mm, 2.5 mm or 3 mm. The second inclined section can guide the rice-water to flow from the second passage 42 to the third passage 43, and then flow from the steam inlet 12 back to a cooker body 102 of the cooking utensil.

The end surface of the flow guide portion 31 opposite to the circumferential wall 112 is spaced apart from the circumferential wall 112 to form a fourth passage 44, an end of the third passage 43 is communicated with an end of the fourth passage 44, the other end of the third passage 43 is communicated with the steam inlet 12, and the other end of the fourth passage 44 is communicated with the steam outlet 13. The distance between the flow guide portion 31 and the circumferential wall 112 may be 2 mm, 2.5 mm or 3 mm. A part of the steam flowing out of the steam inlet 12 can flow sequentially through the third passage 43 and the fourth passage 44 to the steam outlet 13. However, since the third passage 43 has a small diameter and the rice-water flowing out of the steam inlet 12 has foam and a large volume, the rice-water cannot pass through the third passage 43, only can pass through the first passage 41, the rice-water flowing back from the second passage 42 has been deformed by the reinforcing rib 320, the volume thereof has become smaller, and can pass through the third passage 43 and flow back to the steam inlet 12, and then flow back into the cooker body 102.

An included angle between the first inclined section and the horizontal plane 16 is $\alpha$, and $0°<\alpha<90°$. It is preferable that an inclination of the first inclined section is bigger, such that the flowing of the liquid can be better guided. As illustrated in FIG. 13, the bottom wall 111 of the valve base 20 is simplified as a straight line segment, a contact point between the barrier portion 32 and the bottom wall 111 includes a point a and a point e, the point a is adjacent to a middle position of the barrier portion 32, the point e is adjacent to the third passage 43, a distance between the point a and the horizontal plane is ha, and a distance between the point e and the horizontal plane is he. The flow guide portion 31 includes a first blocking piece 310a and a second blocking piece 310b, the second blocking piece 310b is located between the first blocking piece 310a and the barrier portion 32, a contact point between the second blocking piece and the bottom wall 111 includes a point b and a point f, the point b is adjacent to the notch 311, the point f is adjacent to the third passage 43, a distance between the point b and the horizontal plane is hb, and a distance between the point f and the horizontal plane is hf. A contact point between the first blocking piece 310a and the bottom wall 111 includes a point c and a point g, the point c is adjacent to the notch 311, the point g is adjacent to the third passage 43, a distance between the point c and the horizontal plane is hc, and a distance between the point f and the horizontal plane is hg. The ha, he, hb, hf, hc and hg meet the following relation: ha>he, hb>hf, hc>hg, hg<hf<he.

In other words, a height of the point c on the bottom wall from the horizontal plane 16 is greater that a height of the point g on the bottom wall from the horizontal plane 16; a height of the point b on the bottom wall from the horizontal plane 16 is greater than a height of the point f on the bottom wall from the horizontal plane 16; a height of the point a on the bottom wall from the horizontal plane 16 is greater than a height of the point e on the bottom wall from the horizontal plane 16; the height of the point g on the bottom wall from the horizontal plane 16 is less than the height of the point f on the bottom wall from the horizontal plane 16; and the height of the point f on the bottom wall from the horizontal plane 16 is less than the height of the point e on the bottom wall from the horizontal plane 16.

As illustrated in FIGS. 11 to 12, the contact point between the barrier portion 32 and the bottom wall 111 includes the point a, a point e1, a point e2; the contact point between the blocking piece 310 and the bottom wall 111 includes a point b1, a point b2, a point f1, a point f2 and a point c1, a point c2, a point g1, a point g2. The rice-water will flow from the point a to the point e1, the point e2 separately along the barrier portion 32; flow from the b1 to the f1 and from the b2 to the f2 along the blocking piece 310; and flow from the c1 to the g1 and from the c2 to the f2 along the blocking piece 310. The rice-water will internally flow from the point g to the point e, therefore a rapid back flow of the rice-water in the chamber of the steam valve can be achieved.

In the steam valve 1 for the cooking utensil according to embodiments of the present disclosure, by disposing the barrier member 30 in the mounting chamber 11, the barrier member 30 can well change the flow passage structure inside the mounting chamber 11, and can be configured to guide the flow direction of the steam in the mounting chamber 11, such that the steam can be well discharged from the mounting chamber 11; furthermore, the barrier member 30 can have the barrier effect on the rice-water, the rice-water can flow back along the barrier member 30; moreover, the bottom wall 111 of the valve base 20 is obliquely disposed, the liquid on the bottom wall 111 can be guided to flow towards the steam inlet 12, such that the back flow of the liquid in the mounting chamber 11 can be sped up, the spill-proof effect of the steam valve 1 during the boiling stage can be greatly improved. Furthermore, the barrier member 30 has the simple structure and arrangement. A detachable connection can be achieved by a snap fit, such that the arrangement of the barrier member 30 is not limited by the mounting chamber 11, which has a simple structure, is easy to detach and clean, and has a wide range of applications and a good spill-proof effect.

Although appended claims are provided, the present disclosure is also defined by the following provisions.

1. A steam valve 1 for a cooking utensil, including:
   a bonnet 10;
   a valve base 20, the bonnet 10 and the valve base 20 forming a mounting chamber 11, the valve base 20 having a steam inlet 12, at least one of the valve base 20 and the bonnet 10 having a steam outlet 13; and
   a barrier member 30 mounted in the mounting chamber 11, in which the barrier member 30 includes at least one blocking piece 310, the at least one blocking piece 310 and the bonnet 10 define a first passage 41 therebetween, and steam flows from the steam inlet 12 via the first passage 41 to the steam outlet 13.

2. The steam valve 1 according to provision 1, in which the blocking piece 310 is a flat plate or an arc shaped plate.

3. The steam valve 1 according to provision 1 or 2, in which the other end of the barrier member 30 and the bottom wall 111 of the valve base 20 define a second passage 42 therebetween for flowing of the liquid.

4. The steam valve 1 according to provision 3, in which the blocking piece 310 has a notch 311, the notch 311 and the bottom wall 111 of the valve base 20 define the second passage 42 therebetween, a plurality of blocking pieces 310 is provided, and the plurality of blocking pieces 310 is distributed at intervals in an extending direction of the second passage 42,
   the barrier member 30 further includes:
   a reinforcing rib 320, any two adjacent blocking pieces 310 are connected to each other by the reinforcing rib 320.

5. The steam valve 1 according to provision 4, in which the reinforcing rib 320 is located at an end of the blocking piece 310 adjacent to the bonnet 10.

6. The steam valve 1 according to provision 4, in which the barrier member 30 further includes:
   a barrier portion 32 spaced apart from the blocking piece 310, the barrier portion 32 is located at a side of the blocking piece 310 adjacent to the steam inlet 12, and an end of the barrier portion 32 adjacent to the valve base 20 is configured to be a guide section 321 to guide the liquid to the steam inlet 12.

7. The steam valve 1 according to provision 6, in which the guide section 321 is connected to the bottom wall 111 of the valve base 20.

8. The steam valve 1 according to provision 6, in which a part of an inner surface of the bonnet 10 and a part of an inner surface of the valve base 20 cooperatively constitute a circumferential wall 112 of the mounting chamber 11, and an end surface of the barrier portion 32 opposite to the circumferential wall 112 is spaced apart from the circumferential wall 112 to form a third passage 43.

9. The steam valve 1 according to provision 8, in which a distance between the barrier portion 32 and the circumferential wall 112 is 2 mm≤d≤3 mm.

10. A cooking utensil, including:
    a steam valve, the steam valve being a steam valve 1 according to any one of provisions 1 to 9.

Reference throughout this specification to "an embodiment," "some embodiments," "an illustrative embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. A steam valve for a cooking utensil, comprising:
   a bonnet;
   a valve base forming a mounting chamber with the bonnet, the valve base having a steam inlet and at least one of the valve base and the bonnet having a steam outlet; and
   a barrier member mounted in the mounting chamber, wherein the barrier member and a top wall of the bonnet define a first passage therebetween such that steam flows from the steam inlet via the first passage to the steam outlet, and a bottom wall of the valve base corresponding to the barrier member is disposed obliquely such that liquid flows back to the steam inlet, wherein the other end of the barrier member and the bottom wall of the valve base define a second passage therebetween for flowing of the liquid, the bottom wall of the valve base comprises a first inclined section located in the second passage, and the first inclined section is configured to guide the liquid to the steam inlet, wherein the barrier member comprises:
   a flow guide portion comprising a blocking piece and a reinforcing rib, the blocking piece has a notch, the notch and the bottom wall of the valve base define the second passage, a plurality of blocking pieces is provided, the plurality of blocking pieces is distributed at intervals in an extending direction of the second passage, any two adjacent blocking pieces are connected to each other by the reinforcing rib, and the first inclined section is opposite to the notch.

2. The steam valve according to claim 1, wherein the blocking piece is a flat plate or an arc shaped plate.

3. The steam valve according to claim 1, wherein the reinforcing rib is located at an end of the blocking piece adjacent to the bonnet.

4. The steam valve according to claim 1, wherein the barrier member further comprises:
a barrier portion spaced apart from the flow guide portion, the barrier portion is located at a side of the flow guide portion adjacent to the steam inlet, and an end of the barrier portion adjacent to the valve base is configured to be a guide section to guide the liquid to the steam inlet.

5. The steam valve according to claim 4, wherein the guide section is connected to the bottom wall of the valve base.

6. The steam valve according to claim 4, wherein a part of an inner surface of the bonnet and a part of an inner surface of the valve base cooperatively constitute a circumferential wall of the mounting chamber, and an end surface of the barrier portion opposite to the circumferential wall is spaced apart from the circumferential wall to form a third passage.

7. The steam valve according to claim 6, wherein a distance between the barrier portion and the circumferential wall is 2 mm≤d≤3 mm.

8. The steam valve according to claim 6, wherein the bottom wall of the valve base comprises at least one second inclined section, and the second inclined section is inclined towards the third passage to guide the liquid to the third passage.

9. The steam valve according to claim 8, wherein a contact point between the barrier portion and the bottom wall comprises a point a and a point e, the point a is adjacent to a middle position of the barrier portion, the point e is adjacent to the third passage, a distance between the point a and a horizontal plane is ha, and a distance between the point e and the horizontal plane is he,
the flow guide portion comprises a first blocking piece and a second blocking piece, the second blocking piece is located between the first blocking piece and the barrier portion, a contact point between the second blocking piece and the bottom wall comprises a point b and a point f, the point b is adjacent to the notch, the point f is adjacent to the third passage, a distance between the point b and the horizontal plane is hb, and a distance between the point f and the horizontal plane is hf,
a contact point between the first blocking piece and the bottom wall comprises a point c and a point g, the point c is adjacent to the notch, the point g is adjacent to the third passage, a distance between the point c and the horizontal plane is hc, and a distance between the point f and the horizontal plane is hg, and
the ha, he, hb, hf, hc and hg meet the following relation: ha>he, hb>hf, hc>hg, <hf<he.

10. A cooking utensil, comprising:
a steam valve, the steam valve further comprising:
a bonnet;
a valve base forming a mounting chamber with the bonnet, the valve base having a steam inlet and at least one of the valve base and the bonnet having a steam outlet; and
a barrier member mounted in the mounting chamber, wherein the barrier member and a top wall of the bonnet define a first passage therebetween such that steam flows from the steam inlet via the first passage to the steam outlet, and a bottom wall of the valve base corresponding to the barrier member is disposed obliquely such that liquid flows back to the steam inlet, wherein the other end of the barrier member and the bottom wall of the valve base define a second passage therebetween for flowing of the liquid, the bottom wall of the valve base comprises a first inclined section located in the second passage, and the first inclined section is configured to guide the liquid to the steam inlet, wherein the barrier member comprises: a flow guide portion comprising a blocking piece and a reinforcing rib, the blocking piece has a notch, the notch and the bottom wall of the valve base define the second passage, a plurality of blocking pieces is provided, the plurality of blocking pieces is distributed at intervals in an extending direction of the second passage, any two adjacent blocking pieces are connected to each other by the reinforcing rib, and the first inclined section is opposite to the notch.

11. The cooking utensil according to claim 10, wherein the blocking piece is a flat plate or an arc shaped plate.

12. The cooking utensil according to claim 10, wherein the reinforcing rib is located at an end of the blocking piece adjacent to the bonnet.

13. The cooking utensil according to claim 10, wherein the barrier member further comprises:
a barrier portion spaced apart from the flow guide portion, the barrier portion is located at a side of the flow guide portion adjacent to the steam inlet, and an end of the barrier portion adjacent to the valve base is configured to be a guide section to guide the liquid to the steam inlet.

14. The cooking utensil according to claim 13, wherein the guide section is connected to the bottom wall of the valve base.

15. The cooking utensil according to claim 13, wherein a part of an inner surface of the bonnet and a part of an inner surface of the valve base cooperatively constitute a circumferential wall of the mounting chamber, and an end surface of the barrier portion opposite to the circumferential wall is spaced apart from the circumferential wall to form a third passage.

16. The cooking utensil according to claim 15, wherein the bottom wall of the valve base comprises at least one second inclined section, and the second inclined section is inclined towards the third passage to guide the liquid to the third passage.

* * * * *